United States Patent
Yamada et al.

(10) Patent No.: US 7,656,690 B2
(45) Date of Patent: Feb. 2, 2010

(54) VOLTAGE CONVERSION DEVICE AND COMPUTER-READABLE RECORDING MEDIUM WITH PROGRAM RECORDED THEREON FOR COMPUTER TO EXECUTE CONTROL OF VOLTAGE CONVERSION BY VOLTAGE CONVERSION DEVICE

(75) Inventors: Kenji Yamada, Toyota (JP); Eiji Sato, Nishikamo-gun (JP); Masaki Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 443 days.

(21) Appl. No.: 11/274,511

(22) Filed: Nov. 16, 2005

(65) Prior Publication Data

US 2006/0114702 A1    Jun. 1, 2006

(30) Foreign Application Priority Data

Nov. 30, 2004    (JP)    ............................. 2004-346991
Mar. 16, 2005    (JP)    ............................. 2005-075624

(51) Int. Cl.
H02M 7/48    (2007.01)
H02M 1/12    (2007.01)
H02M 1/14    (2007.01)

(52) U.S. Cl. ........................................ 363/71; 363/41

(58) Field of Classification Search .................... 363/37, 363/41, 44, 84, 125, 127, 35, 65, 34, 71, 363/131; 323/222, 225, 259, 260, 266, 299, 323/301; 318/801, 809
See application file for complete search history.

(56) References Cited

U.S. PATENT DOCUMENTS 5,068,777 A * 11/1991 Ito ............................... 363/97

(Continued)

FOREIGN PATENT DOCUMENTS

EP    1 473 819 A    11/2004

(Continued)

OTHER PUBLICATIONS

English Translation of Partial European Search Report No. EP 05 02 4423, issued Mar. 20, 2006.

(Continued)

*Primary Examiner*—Jessica Han
*Assistant Examiner*—Emily Pham
(74) *Attorney, Agent, or Firm*—Kenyon & Kenyon LLP

(57) ABSTRACT

A control device calculates a voltage command value of a voltage step-up converter based on a torque command value and a motor revolution number and calculates the on-duty of an NPN transistor based on the calculated voltage command value and a DC voltage from a voltage sensor. Under the conditions that the on-duty is influenced by a dead time and the DC voltage is smaller than a predetermined set value, the control device controls NPN transistors to step-up or step-down the voltage while fixing the on-duty at 1.0.

14 Claims, 25 Drawing Sheets

U.S. PATENT DOCUMENTS

| | | | | |
|---|---|---|---|---|
| 5,373,195 | A | * 12/1994 | De Doncker et al. | 307/45 |
| 5,883,484 | A | * 3/1999 | Akao | 318/700 |
| 5,930,132 | A | 7/1999 | Watanabe | |
| 6,714,424 | B2 | * 3/2004 | Deng et al. | 363/17 |
| 6,727,676 | B2 | * 4/2004 | Ochiai | 320/104 |
| 6,917,179 | B2 | * 7/2005 | Komatsu et al. | 318/700 |
| 7,132,809 | B1 | * 11/2006 | Chang | 318/268 |
| 2003/0081440 | A1 | * 5/2003 | Komatsu et al. | 363/132 |
| 2004/0037097 | A1 | 2/2004 | Deng et al. | |
| 2005/0093600 | A1 | * 5/2005 | Kwak | 327/161 |
| 2006/0238167 | A1 | * 10/2006 | Arai et al. | 320/132 |
| 2007/0165432 | A1 | * 7/2007 | Okamura et al. | 363/132 |

FOREIGN PATENT DOCUMENTS

| | | |
|---|---|---|
| JP | 08-214592 | 8/1996 |
| JP | 2004-112904 | 4/2004 |
| JP | 2005-051895 | 2/2005 |
| WO | WO 2005/013467 | 2/2005 |

OTHER PUBLICATIONS

Pedersen, J.K., et al: "*Digital Quasi-Random Modulated SFAVM PWM in an AC-Drive System*," Oct. 1, 1994, IEEE Transactions on Industrial Electronics, pp. 518-525.

Oliveira, A.C., of al: "*Varying the Switching Frequency to Compensate the Dead-Time in Pulse Width Modulated Voltage Source Inverters*," Jun. 23, 2002, $33^{rd}$ Annual IEEE Power Electronics Specialists Conference, PESC 2002, Conference Proceedings, Cairns, Queensland, Australia, Jun. 23-27, 2002, Annual Power Electronics Specialists Conference, New York, NY: IEEE, US, pp. 244-249.

Lai Y-S, et al: "*Optimal Common-Mode Voltage Reduction PWM Technique for Inverter Control With Consideration of the Dead-Time Effects-Part I: Basic Development*," Nov. 2004, IEEE Transactions on Industry Applications, pp. 1605-1612.

European Search Report for Appln. No. 05024423.5—2207 dated Jul. 28, 2006.

\* cited by examiner

VOLTAGE CONVERSION DEVICE AND COMPUTER-READABLE RECORDING MEDIUM WITH PROGRAM RECORDED THEREON FOR COMPUTER TO EXECUTE CONTROL OF VOLTAGE CONVERSION BY VOLTAGE CONVERSION DEVICE

This nonprovisional application is based on Japanese Patent Applications Nos. 2004-346991 and 2005-075624 filed with the Japan Patent Office on Nov. 30, 2004 and Mar. 16, 2005, respectively, the entire contents of which are hereby incorporated by reference.

BACKGROUND OF THE INVENTION

1. Field of the Invention

The present invention relates to a voltage conversion device and a computer-readable recording medium having a program recorded thereon for a computer to execute control of voltage conversion by a voltage conversion device.

2. Description of the Background Art

Hybrid vehicles and electric vehicles have recently been of great interest as environment-friendly vehicles. A hybrid vehicle has, as its power sources, a DC (direct current) power supply, an inverter and a motor driven by the inverter in addition to a conventional engine. More specifically, the engine is driven to provide a power source and a DC voltage from the DC power supply is converted by the inverter into an AC (alternating current) voltage to be used for rotating the motor and thereby providing a power source.

An electric vehicle refers to a vehicle that has, as its power sources, a DC power supply, an inverter and a motor driven by the inverter.

Regarding such a hybrid vehicle or electric vehicle, a configuration has also been studied with which a DC voltage from the DC power supply is stepped up by a voltage step-up converter and the stepped up DC voltage is supplied to the inverter that drives motor (for example, see Japanese Patent Laying-Open Nos. 08-214592 and 2005-051895).

The voltage step-up converter is comprised of two NPN transistors connected in series between a power supply line and a ground line of the inverter and a reactor having one end connected to an intermediate point between the two NPN transistors and the other end connected to a power supply line of the power supply.

The voltage step-up converter turns on/off the NPN transistor connected to the power supply line (upper arm) and the NPN transistor connected to the ground line (lower arm) at a predetermined duty ratio so as to step up a DC voltage from the power supply and supply the stepped up voltage to the inverter while stepping down a DC voltage from the inverter to supply the stepped-down voltage to the power supply.

Since the upper arm and the lower arm that are components of the voltage step-up converter are connected in series between the power supply line and the ground line, the upper arm and the lower arm have to be prevented from being simultaneously ON. Therefore, to a control signal for controlling switching of the upper arm and the lower arm, a dead time is provided for preventing the upper arm and the lower arm from being simultaneously ON.

FIG. 28 is a timing chart of control signals controlling the upper arm and the lower arm.

Referring to FIG. 28, the upper arm and the lower arm are turned on/off at a predetermined duty ratio in each control period T. The lower arm is kept ON until timing t1 while the upper arm is kept OFF until timing t1. If the upper arm is thereafter turned on and the lower arm is thereafter turned off at timing t1, the upper arm and the lower arm could be ON at the same time. Therefore, the lower arm is turned off at timing t1 and the upper arm is turned on at timing t2 at which a certain dead time has passed since timing t1.

However, if a voltage command value of the voltage step-up converter is considerably close to a power supply voltage, the on-duty of the upper arm (referring to the period during which the upper arm is kept ON) is fairly high, for example, 0.98. In such a case, a part of the on-duty 0.98 is taken or occupied by the dead time, and thus the time during which the upper arm should be kept ON cannot be ensured. In other words, in a region of the on-duty that is fairly close to 1.0, there arises a dead zone where any on-duty cannot be ensured as it is due to the dead time.

FIGS. 29A and 29B are timing charts respectively of the voltage and on-duty of the upper arm.

Referring to FIG. 29A, supposing that an operation of stepping up power supply voltage Vb is started at timing t0, the voltage command value increases from power supply voltage Vb. In the period from timing t0 to timing t1, the voltage command value is very close to power supply voltage Vb. Therefore, the on-duty of the upper arm that is calculated based on the voltage command value is partially occupied by the dead time of the upper arm and thus the original on-duty cannot be ensured. As a result, the on-duty of the upper arm that is in the range for example of 1.0 to 0.95 cannot be controlled linearly and thus oscillates (see FIG. 29B). Accordingly, the output voltage of the step-up converter also oscillates (see FIG. 29A).

As the on-duty of the upper arm that is calculated based on the voltage command value reaches for example 0.95, the on-duty is not partially occupied by the dead time and the on-duty can be controlled linearly.

As seen from the above, when the voltage command value is in a region fairly close to power supply voltage Vb, the on-duty of the upper arm is partially occupied by the dead time, the output voltage of the voltage step-up converter oscillates and the DC current from the power supply also oscillates. As a result, the power supply could be broken.

In addition, in a period in which a voltage step-up operation is performed, when the on-duty of the upper arm is in the above-described dead zone, the original on-duty cannot be ensured while the on-duty suddenly changes to 1.0 at a timing at which the voltage step-up operation is stopped. At this time, as the on-duty suddenly changes, the output voltage of the voltage step-up converter also suddenly decreases to power supply voltage Vb. Accordingly, the DC current from the power supply suddenly increases. As a result, the power supply is deteriorated in performance because the excessively large DC current flows, and accordingly shorten in lifetime.

SUMMARY OF THE INVENTION

An object of the present invention is to provide a voltage conversion device capable of reducing oscillation of an output voltage.

Another object of the present invention is to provide a computer-readable recording medium having a program recorded thereon for a computer to execute control of voltage conversion with which oscillation of an output voltage can be reduced According to the present invention, a voltage conversion device variably changing an input voltage to an inverter includes: a voltage converter including an upper arm and a lower arm and performing voltage conversion between a power supply and the inverter by switching of the upper arm and the lower arm; and a control device controlling the voltage converter so as to reduce influence of a dead time of the voltage converter on a duty of the switching.

Preferably, when a voltage command value of the voltage conversion is larger than a power supply voltage and smaller than a predetermined voltage and the power supply voltage is smaller than a predetermined set value, the control device controls the voltage converter by setting the duty to a duty for instructing to stop the voltage conversion.

Preferably, when the voltage command value is larger than the power supply voltage and smaller than the predetermined voltage and the power supply voltage is at least the predetermined set value, the control device controls the voltage converter by setting the duty to a duty for instructing to perform the voltage conversion.

Preferably, the predetermined set value is set based on an allowable maximum voltage of the power supply, a maximum value of DC current of the power supply when the voltage converter makes a transition to a state where the voltage conversion is stopped, and an internal resistance of the power supply.

Preferably, the internal resistance is set to a maximum value of the internal resistance that can be taken by the power supply.

Preferably, the internal resistance is set to a measured value of the internal resistance.

Preferably, the internal resistance is set based on the temperature of the power supply.

Preferably, the maximum value of the DC current is set based on a detected value of an output voltage of the voltage converter and a detected value of the power supply voltage.

According to the present invention, a voltage conversion device variably changing an input voltage to an inverter includes: a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm; and a control device controlling switching of the upper arm and the lower arm by setting the first on-duty to an appropriate on-duty, when the first on-duty calculated based on a voltage command value of the voltage conversion by the voltage converter is influenced by a dead time of the upper arm and the lower arm and a power supply voltage is influenced by the dead time.

Preferably, when the first on-duty calculated based on the voltage command value is larger than a maximum effective on-duty and smaller than a longest on-duty for keeping the upper arm ON for a control period length and the power supply voltage is at least a predetermined set value, the control device controls switching of the upper arm and the lower arm by setting the first on-duty to the maximum effective on-duty. The maximum effective on-duty is determined by dividing an effective control period length by the control period length, where the effective control period length is determined by subtracting the dead time from the control period length. The predetermined set value is determined by subtracting, from an allowable maximum voltage of the power supply, a product of an internal resistance of the power supply and a maximum value of DC current of the power supply when the first on-duty s switched to the longest on-duty.

Preferably, when the first on-duty calculated based on the voltage command value is larger than the maximum effective on-duty and smaller than the longest on-duty for keeping the upper arm ON for the control period length and the power supply voltage is smaller than the predetermined set value, the control device controls switching of the upper arm and the lower arm by setting the first on-duty to the longest on-duty.

Preferably, in a case where a voltage command value of the voltage conversion by the voltage converter is larger than a power supply voltage and smaller than a predetermined voltage, the control device controls the voltage converter by setting the duty using a first duty that is a duty when a voltage of at least the predetermined voltage is the voltage command value and a second duty that is a duty when the power supply voltage is the voltage command value.

Preferably, in a case where there is a possibility that a surge of DC current of the power supply occurs, the control device controls the voltage converter by setting the duty using a first duty that is a duty when a voltage of at least a predetermined voltage is the voltage command value and a second duty that is a duty when the power supply voltage is the voltage command value.

Preferably, the control device sets the duty by making a switch between the first duty and the second duty at a predetermined ratio.

According to the present invention, voltage conversion device variably changing an input voltage to an inverter includes: a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm; and a control device controlling switching of the upper arm and the lower arm by setting the first on-duty by making a switch between a maximum effective on-duty and a longest on-duty at which the upper arm is kept ON for a control period length, when the first on-duty calculated based on a voltage command value of the voltage conversion by the voltage converter is influenced by a dead time of the upper arm and the lower arm. The maximum effective on-duty is determined by dividing an effective control period length by the control period length, where the effective control period length is determined by subtracting the dead time from the control period length.

Preferably, when a voltage command value of the voltage conversion by the voltage converter is larger than a power supply voltage and smaller than a predetermined voltage, the control device controls the voltage converter by changing a carrier frequency at which switching of the upper arm and the lower arm is controlled.

Preferably, when the control device performs control for stepping down an output voltage of the voltage converter or control for stepping up the output voltage of the voltage converter and the voltage command value is larger than the power supply voltage and smaller than the predetermined voltage, the control device changes the carrier frequency.

Preferably, when the control device performs control for stepping down an output voltage of the voltage converter and the voltage command value is larger than the power supply voltage and smaller than the predetermined voltage, the control device changes the carrier frequency.

Preferably, the predetermined voltage is determined based on the dead time of the voltage converter.

According to the present invention, a voltage conversion device variably changing an input voltage to an inverter includes: a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm; and a control device controlling switching of the upper arm and the lower arm by changing a carrier frequency at which switching of the upper arm and the lower arm is controlled, according to an increase of the first on-duty, when the first on-duty calculated based on a voltage command value of the voltage conversion by the voltage converter is influenced by a dead time of the upper arm and the lower arm.

Preferably, the control device changes the carrier frequency in a predetermined period at start of the voltage conversion and in a predetermined period at a transition to a state where the voltage conversion is stopped.

According to the present invention, a computer-readable recording medium having a program recorded thereon for computer's execution is a computer-readable recording medium having a program recorded thereon for a computer to execute control of voltage conversion by a voltage conversion device. The voltage conversion device has a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm. Following the program, the computer executes: a first step of calculating the first on-duty based on a voltage command value of the voltage conversion; a second step of determining whether or not the calculated first on-duty is influenced by a dead time of the upper arm and the lower arm; a third step of determining, when it is determined that the calculated first on-duty is influenced by the dead time, whether or not a power supply voltage is influenced by the dead time; and a fourth step of controlling, when it is determined that the power supply voltage is influenced by the dead time, switching of the upper arm and the lower arm by setting the first on-duty to an appropriate on-duty.

Preferably, the second step includes: a first sub step of calculating a maximum effective on-duty by using the dead time; a second sub step of determining whether the calculated first on-duty is larger than the maximum effective on-duty and smaller than a longest on-duty at which the upper arm is kept ON for a control period length; a third sub step of determining that the first on-duty is influenced by the dead time when the first on-duty is larger than the maximum effective on-duty and smaller than the longest on-duty; and a fourth sub step of determining that the first on-duty is not influenced by the dead time when the first on-duty is at most the maximum effective on-duty or is the longest on-duty. The maximum effective on-duty is determined by dividing an effective control period length by the control period length, where the effective control period length is determined by subtracting the dead time from the control period length.

Preferably, the third step includes: a fifth sub step of determining whether or not the power supply voltage is smaller than a predetermined set value; a sixth sub step of determining that the power supply voltage is influenced by the dead time, when the power supply voltage is at least the predetermined set value; and a seventh sub step of determining that the power supply voltage is not influenced by the dead time, when the power supply voltage is smaller than the predetermined set value. The predetermined set value is determined by subtracting, from an allowable maximum voltage of the power supply, a product of an internal resistance of the power supply and a maximum value of DC current of the power supply when the first on-duty is switched to the longest on-duty.

Preferably, when it is determined that the power supply voltage is influenced by the dead time, the fourth step controls switching of the upper arm and the lower arm by setting the first on-duty to the maximum effective on-duty.

Preferably, when it is determined that the power supply voltage is not influenced by the dead time, the computer executes a fifth step of controlling switching of the upper arm and the lower arm by setting the first on-duty to the longest on-duty.

According to the present invention, a computer-readable recording medium having a program recorded thereon for computer's execution is a computer-readable recording medium having a program recorded thereon for a computer to execute control of voltage conversion by a voltage conversion device. The voltage conversion device has a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm. Following the program, the computer executes: a first step of calculating the first on-duty based on a voltage command value of the voltage conversion; a second step of determining whether or not the calculated first on-duty is influenced by a dead time of the upper arm and the lower arm; and a third step of controlling switching of the upper arm and the lower arm by setting the first on-duty using a maximum effective on-duty and a longest on-duty at which the upper arm is kept ON for a control period length, when it is determined that the first on-duty is influenced by the dead time.

Preferably, the second step includes: a first sub step of calculating the maximum effective on-duty using the dead time; a second sub step of determining whether or not the calculated first on-duty is larger than the maximum effective on-duty and smaller than the longest on-duty for keeping ON the upper arm for the control period length; a third sub step of determining that the first on-duty is influenced by the dead time, when the first on-duty is larger than the maximum effective on-duty and smaller than the longest on-duty; and a fourth sub step of determining that the first on-duty is not influenced by the dead time, when the first on-duty is at most the maximum effective on-duty or is the longest on-duty. The maximum effective on-duty is determined by dividing an effective control period length by the control period length, where the effective control period length is determined by subtracting the dead time from the control period length.

Preferably, the second step includes: a first sub step of detecting DC current of the power supply; a second sub step of determining whether or not a slope of an output waveform of the detected DC current of the power supply is larger than a predetermined threshold; a third sub step of determining that the first on-duty is influenced by the dead time, when the slope of the output waveform of the DC current of the power supply is larger than the predetermined threshold; and a fourth sub step of determining that the first on-duty is not influenced by the dead time, when the slope of the output waveform of the DC current of the power supply is at most the predetermined threshold.

Preferably, the third step sets the on-duty by making a switch between the maximum effective on-duty and the longest on-duty at a predetermined ratio.

According to the present invention, a computer-readable recording medium having a program recorded thereon for computer's execution is a computer-readable recording medium having a program recorded thereon for a computer to execute control of voltage conversion by a voltage conversion device. The voltage conversion device has a voltage converter including an upper arm that is made ON at a first on-duty and a lower arm that is made ON at a second on-duty determined by subtracting the first on-duty from 1, and performing voltage conversion between a power supply and the inverter by switching of the upper arm and the lower arm. Following the program, the computer executes: a first step of calculating the first on-duty based on a voltage command value of the voltage conversion; a second step of determining whether or not the calculated first on-duty is influenced by a dead time of the upper arm and the lower arm; and a third step of controlling, when it is determined that the calculated first on-duty is influenced by the dead time, switching of the upper arm and the lower arm by changing a carrier frequency at which switching of the upper arm and the lower arm is controlled.

Preferably, the second step includes: a first sub step of determining whether control for stepping down is performed or stepping up is performed for an output voltage of the voltage converter; a second sub step of determining that the first on-duty is influenced by the dead time, when control for stepping down the output voltage of the voltage converter is performed; and a third sub step of determining that the first on-duty is not influenced by the dead time, when control for stepping up the output voltage of the voltage converter is performed.

Preferably, the third step changes the carrier frequency according to an increase of the first on-duty.

Preferably, the third step changes the carrier frequency in a predetermined period at start of the voltage conversion and in a predetermined period at transition to a state where the voltage conversion is stopped.

The voltage conversion device of the present invention sets the duty to a duty for instructing to perform voltage conversion, when the voltage command value of the voltage conversion is at least the power supply voltage and at most a predetermined voltage and the power supply voltage is at least a predetermined set value.

Thus, since the voltage converter does not make a transition to a state where the voltage conversion is stopped, variation in voltage of the power supply is reduced.

The voltage conversion device of the present invention sets, in a case where the voltage command value of the voltage conversion is at least the power supply voltage and at most a predetermined voltage, the duty using the first duty that is a duty when a voltage of at least the predetermined voltage is the voltage command value and the second duty that is a duty when the power supply voltage is the voltage command value.

Thus, the duty can linearly be controlled without influence of the dead time and oscillation of the DC current from the power supply can be reduced.

The voltage conversion device of the present invention controls the voltage converter by changing the carrier frequency at which the switching is controlled, when the voltage command value of the voltage conversion is at least the power supply voltage and at most a predetermined voltage.

Thus, any difference between a duty based on the voltage command value and an actual duty, which is caused by the dead time, can be reduced and, variation in output voltage of the voltage converter as well as variation in DC current can be reduced.

According to the present invention, oscillations in output voltage of the voltage converter and the DC current from the power supply can be reduced. Accordingly, the power supply can be prevented from being broken.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
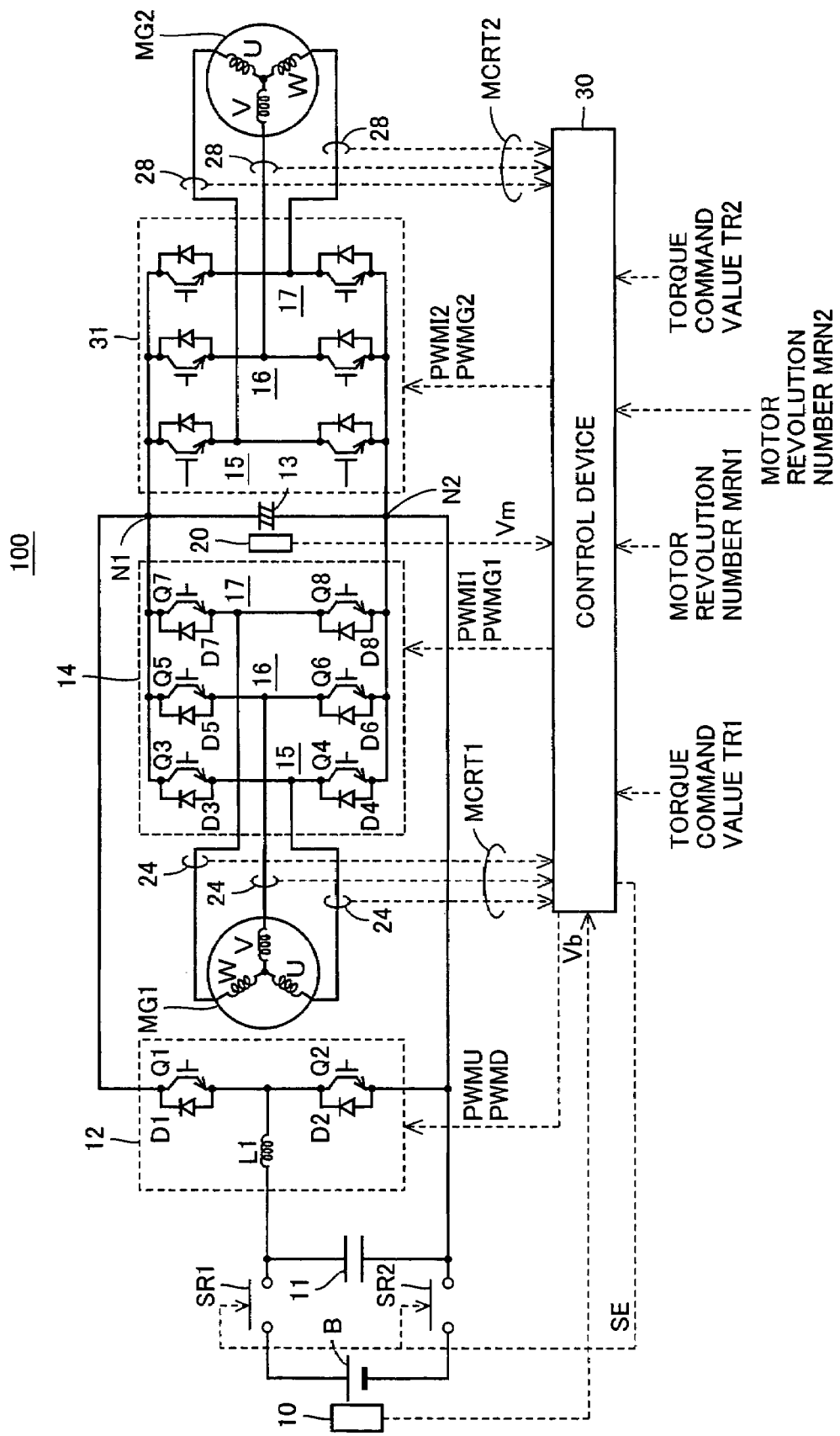
FIG. 1 is a schematic block diagram of a motor drive apparatus having a voltage conversion device according to a first embodiment of the present invention.

Embodiments of the present invention are hereinafter described in detail with reference to the drawings. In the drawings, like components are denoted by like reference characters.

First Embodiment

FIG. 1 is a schematic block diagram of a motor drive apparatus having a voltage conversion device according to a first embodiment of the present invention.

Referring to FIG. 1, motor drive apparatus 100 includes a DC power supply B, voltage sensors 10, 20, system relays SR1, SR2, capacitors 11, 13, a voltage step-up converter 12, inverters 14, 31, current sensors 24, 28, and a control device 30.

A motor generator MG1 is mounted for example on a hybrid vehicle. Motor generator MG1 is connected to an engine (not shown) of the hybrid vehicle to serve as an electric generator driven by the engine while serving as an electric motor for the engine, for example, capable of starting the engine. Control is performed for keeping the engine in an efficient operating state by adjusting power generation torque of motor generator MG1. Thus, favorable fuel economy and exhaust gas of the hybrid vehicle can be achieved.

A motor generator MG2 is mounted for example on a hybrid vehicle. Motor generator MG2 is a drive motor for generating torque and thereby driving drive wheels of the hybrid vehicle. In addition, in such a case as deceleration of the vehicle where rotations of the drive wheels rotate motor generator MG2, motor generator MG2 can serve as an electric generator (the function of so-called regenerative power generation).

Voltage step-up converter 12 includes a reactor L1, NPN transistors Q1, Q2 and diodes D1, D2. One end of reactor L1 is connected to a power supply line of DC power supply B and the other end is connected to an intermediate point between NPN transistors Q1 and Q2, namely between the emitter of NPN transistor Q1 and the collector of NPN transistor Q2. NPN transistors Q1, Q2 are connected in series between the power supply line and a ground line. The collector of NPN transistor Q1 is connected to the power supply line while the emitter of NPN transistor Q2 is connected to the ground line. Between respective collectors and emitters of NPN transistors Q1, Q2, diodes D1, D2 for flowing current from respective emitters to respective collectors are connected.

Inverter 14 is comprised of a U phase arm 15, a V phase arm 16 and a W phase arm 17. U phase arm 15, V phase arm 16 and W phase arm 17 are connected in parallel between the power supply line and the ground line.

U phase arm 15 is comprised of series-connected NPN transistors Q3, Q4, V phase arm 16 is comprised of series-connected NPN transistors Q5, Q6 and W phase arm 17 is comprised of series-connected NPN transistors Q7, Q8. Between respective collectors and emitters of NPN transistors Q3-Q8, diodes D3-D8 for flowing current from respective emitters to respective collectors are connected.

An intermediate point of each phase arm is connected to an end of each phase coil of motor generator MG1. Specifically, motor generator MG1 is a three-phase permanent-magnet motor configured of three coils of U, V and W phases respectively. One end of the U phase coil, one end of the V phase coil and one end of the W phase coil are connected at the common central junction, while the other end of the U phase coil is connected to an intermediate point between NPN transistors Q3, Q4, the other end of the V phase coil is connected to an intermediate point between NPN transistors Q5, Q6 and the other end of the W phase coil is connected to an intermediate point between NPN transistors Q7, Q8.

Inverter 31 is configured identically to inverter 14.

DC power supply B is comprised of secondary or rechargeable cell(s), for example, of nickel hydride or lithium ion. Voltage sensor 10 detects DC voltage Vb (also referred to as "battery voltage Vb") which is output from DC power supply B to output the detected DC voltage Vb to control device 30.

System relays SR1, SR2 are turned on/off in response to signal SE from control device 30.

Capacitor 11 smoothes DC voltage Vb supplied from DC power supply B to provide the smoothed DC voltage Vb to voltage step-up converter 12.

Voltage step-up converter 12 steps up the DC voltage Vb from capacitor 11 to supply the stepped up voltage to capacitor 13. More specifically, receiving signal PWMU from control device 30, voltage step-up converter 12 increases the DC voltage Vb according to the period of time during which NPN transistor Q2 is ON in response to signal PWMU, and supplies the increased voltage to capacitor 13.

Further, receiving signal PWMD from control device 30, voltage step-up converter 12 steps down a DC voltage supplied via capacitor 13 from inverter 14 and/or inverter 31 to charge DC power supply B.

Capacitor 13 smoothes the DC voltage from voltage step-up converter 12 to supply the smoothed DC voltage to inverters 14, 31 via nodes N1, N2. Voltage sensor 20 detects the terminal-to-terminal voltage of capacitor 13, namely output voltage Vm of voltage step-up converter 12 (corresponding to the input voltage to inverters 14, 31, which is hereinafter applied as well) to output the detected output voltage Vm to control device 30.

Receiving the DC voltage supplied from capacitor 13, inverter 14 converts the DC voltage into an AC voltage based on signal PWMI1 from control device 30 to drive motor generator MG1. Accordingly, motor generator MG1 is driven to generate torque indicated by torque command value TR1.

In a regenerative braking mode of the hybrid vehicle having motor drive apparatus 100 mounted thereon, inverter 14 converts an AC voltage generated by motor generator MG1 into a DC voltage based on signal PWMC1 from control device 30 to supply the resultant DC voltage to voltage step-up converter 12 via capacitor 13. The regenerative braking here includes braking accompanied by regenerative power generation that is effected when a driver of the hybrid vehicle steps on the foot brake as well as deceleration (or stop of acceleration) accompanied by regenerative power generation that is effected when the driver releases the accelerator pedal without operating the foot brake.

Receiving the DC voltage from capacitor 13, inverter 31 converts the DC voltage based on signal PWMI2 from control device 30 into an AC voltage to drive motor generator MG2. Accordingly, motor generator MG2 is driven to generate torque indicated by torque command value TR2.

In the regenerative braking mode of the hybrid vehicle having motor drive apparatus 100 mounted thereon, inverter 31 converts an AC voltage generated by motor generator MG2 into a DC voltage based on signal PWMC2 from control device 30 to supply the resultant DC voltage to voltage step-up converter 12 via capacitor 13.

Current sensors 24 detect motor current MCRT1 flowing through motor generator MG1 to output the detected motor current MCRT1 to control device 30. Current sensors 28 detect motor current MCRT2 flowing through motor generator MG2 to output the detected motor current MCRT2 to control device 30.

Control device 30 receives from voltage sensor 10 DC voltage Vb which is output from DC power supply B, receives motor currents MCRT1, MCRT2 from respective current sensors 24, 28, receives from voltage sensor 20 output voltage Vm (namely the input voltage to inverters 14, 31) of voltage step-up converter 12, and receives from an external ECU (Electrical Control Unit) torque command values TR1, TR2 as well as motor revolution number (number of revolutions of the motor) MRN1 and motor revolution number MRN2. Control device 30 generates, based on output voltage Vm, motor current MCRT1 and torque command value TR1, signal PWMI1 or signal PWMC1 for controlling switching of NPN transistors Q3-Q8 of inverter 14 driving motor generator MG1, according to a method hereinlater described, and outputs the generated signal PWMI1 or PWMC1 to inverter 14.

Further, control device 30 generates, based on output voltage Vm, motor current MCRT2 and torque command value TR2, signal PWMI2 or signal PWMC2 for controlling switching of NPN transistors Q3-Q8 of inverter 31 driving motor generator MG2, according to a method hereinlater described, and outputs the generated signal PWMI2 or PWMC2 to inverter 31.

Moreover, when inverter 14 (or 31) drives motor generator MG1 (or MG2), control device 30 generates, based on DC voltage Vb, output voltage Vm, torque command value TR1 (or TR2) and motor revolution number MRN1 (or MRN2), signal PWMU or signal PWMD for controlling switching of NPN transistors Q1, Q2 of voltage step-up converter 12, according to a method hereinlater described, and outputs the generated signal to voltage step-up converter 12.

Moreover, control device 30 generates signal SE for turning on/off system relays SR1, SR2 to output this signal to system relays SR1, SR2.

Figure 2:
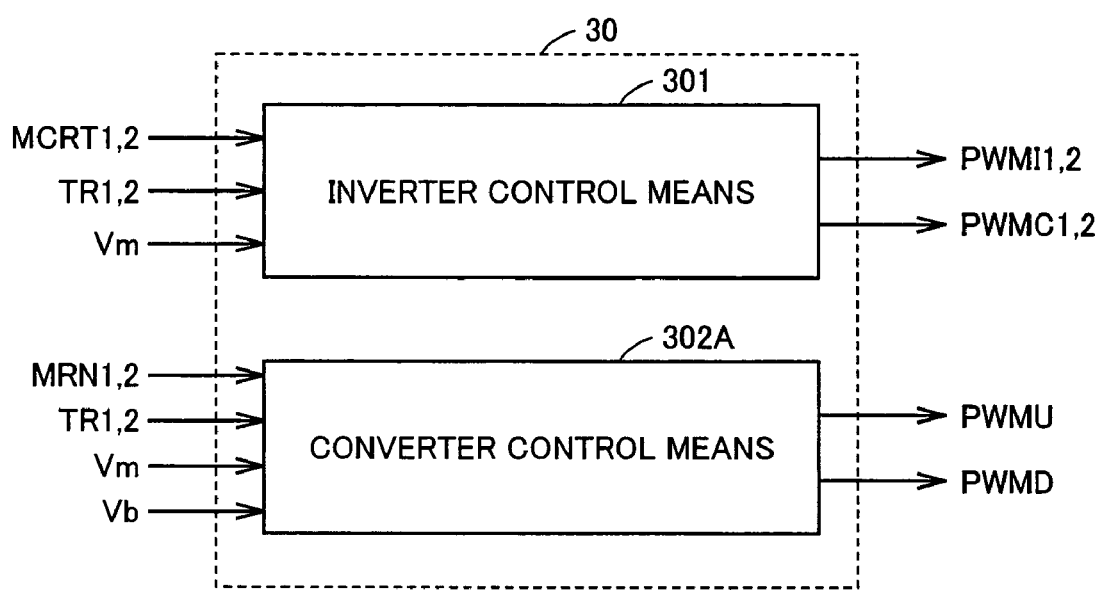
FIG. 2 is a functional block diagram of a control device shown in FIG. 1.

FIG. 2 is a functional block diagram of control device 30 shown in FIG. 1.

Referring to FIG. 2, control device 30 includes inverter control means 301 and converter control means 302A.

Inverter control means 301 generates signal PWMI1 or signal PWMC1 based on torque command value TR1, motor current MCRT1 and voltage Vm to output the generated signal to NPN transistors Q3-Q8 of inverter 14.

More specifically, based on voltage Vm, motor current MCRT1 and torque command value TR1, inverter control means 301 calculates the voltage to be applied to each phase of motor generator MG1 and generates, based on the calculated voltage, signal PWMI1 or PWMC1 for actually turning on/off NPN transistors Q3-Q8 each of inverter 14. Then, inverter control means 301 outputs the generated signal PWMI1 or PWMC1 to NPN transistors Q3-Q8 each of inverter 14.

Switching of NPN transistors Q3-Q8 each of inverter 14 is thus controlled so that current to be flown to each phase of motor generator MG1 is controlled for outputting the torque by motor generator MG1 according to the torque command. In this way, the motor drive current is controlled and the motor torque is output according to torque command value TR1.

Further, inverter control means 301 generates, based on voltage Vm, motor current MCRT2 and torque command value TR2, signal PWMI2 or signal PWMC2 by the above-described method to output the generated signal to NPN transistors Q3-Q8 of inverter 31.

Switching of NPN transistors Q3-Q8 each of inverter 31 is thus controlled so that current to be flown to each phase of motor generator MG2 is controlled for outputting the torque by motor generator MG2 according to the command. In this way, the motor drive current is controlled and the motor torque is output according to torque command value TR2.

Whether the operation mode of motor generator MG1 (or MG2) is powering, namely electric motor mode or regenerative, namely electric power generator mode is determined from the relation between torque command value TR1 (or TR2) and motor revolution number MRN1 (or MRN2). It is supposed here that the horizontal or x-axis of a rectangular coordinate system indicates motor revolution number MRN and the vertical or y-axis thereof indicates torque command value TR. Then, if the correlated torque command value TR1 (or TR2) and motor revolution number MRN1 (or MRN2) are in the first or second quadrant, the operation mode of motor generator MG1 (or MG2) is the powering mode. If the correlated torque command value TR1 (or TR2) and motor revolution number MRN1 (or MRN2) are in the third or fourth quadrant, the operation mode of motor generator MG1 (o MG2) is the regenerative mode.

Accordingly, inverter control means 301 generates, if it receives positive torque command value TR1 (or TR2), signal PWMI1 (or signal PWMI2) for driving motor generator MG1 (or MG2) as a drive motor to output the generated signal to NPN transistors Q3-Q8 of inverter 14 (or 31) and generates, if it receives negative torque command value TR1 (or TR2), signal PWMC1 (or signal PWMC2) for driving motor generator MG1 (or MG2) in the regenerative mode to output the generated signal to NPN transistors Q3-Q8 of inverter 14 (or 31).

Converter control means 302A generates signal PWMU or signal PWMD based on torque command value TR1 (or TR2), motor revolution number MRN1 (or MRN2), DC voltage Vb and voltage Vm, according to a method hereinlater described, to output the generated signal to NPN transistors Q1, Q2 of voltage step-up converter 12.

Figure 3:
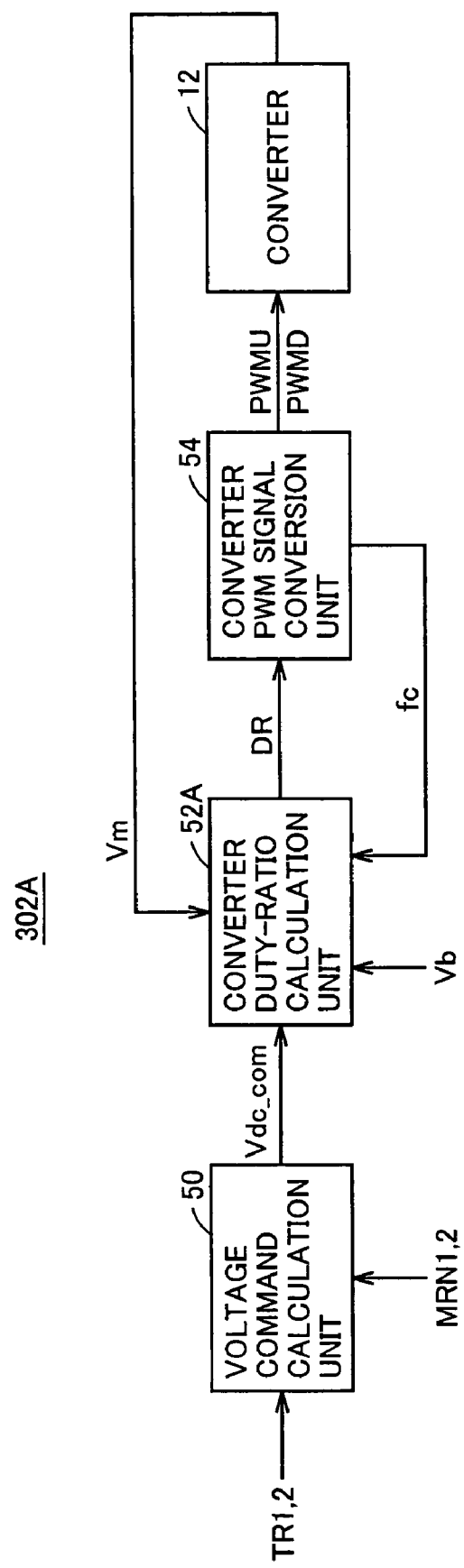
FIG. 3 is a functional block diagram of converter control means shown in FIG. 2.

FIG. 3 is a functional block diagram of converter control means 302A shown in FIG. 2. Referring to FIG. 3, converter control means 302A includes a voltage command calculation unit 50, a converter duty-ratio calculation unit 52A and a converter PWM signal conversion unit 54.

Voltage command calculation unit 50 calculates, based on torque command value TR1 (or TR2) and motor revolution number MRN1 (or MRN2) from the external ECU, an optimum value (target value) of the inverter input voltage, namely voltage command value Vdc_com of voltage step-up converter 12, and outputs the calculated voltage command value Vdc_com to converter duty-ratio calculation unit 52A.

Converter duty-ratio calculation unit 52A calculates, based on voltage command Vdc_com from voltage command calculation unit 50 and DC voltage Vb from voltage sensor 10, on-duty D_ON_1 of NPN transistor Q1 of voltage step-up converter 12 according to expression (1).

$$D\_ON\_1 = Vb/Vdc\_com \quad (1)$$

Then, converter duty-ratio calculation unit 52A uses the calculated on-duty D_ON_1 to calculate on-duty D_ON_2=1−D_ON_1 of NPN transistor Q2.

Further, converter duty-ratio calculation unit 52A receives from converter PWM signal conversion unit 54 carrier frequency fc for controlling switching of NPN transistors Q1, Q2 to calculate control period length T determined by the received carrier frequency fc. Converter duty-ratio calculation unit 52A holds dead time Dt of NPN transistors Q1, Q2 and calculates maximum effective on-duty D_MAX of NPN transistor Q1 with influence of dead time Dt removed therefrom according to expression (2):

$$D\_MAX = (T-Dt)/T \quad (2)$$

where T−Dt represents an effective control period length determined by subtracting dead time Dt from control period length T.

Then, using expression (1), converter duty-ratio calculation unit 52A determines whether or not on-duty D_ON_1 calculated based on voltage command value Vdc_com is influenced by dead time Dt.

More specifically, converter duty-ratio calculation unit 52A determines whether or not the calculated on-duty D_ON_1 is larger than maximum effective on-duty D_MA and smaller than the longest on-duty (meaning that the on-duty is "1", which is hereinafter applied as well) that allows NPN transistor Q1 to continuously be kept ON during control period length T. If on-duty D_ON_1 is larger than maximum effective on-duty D_MAX and smaller than the longest on-duty, converter duty-ratio calculation unit 52A determines that on-duty D_ON_1 is influenced by dead time Dt. If on-duty D_ON_1 is equal to or smaller than maximum effective on-duty D_MAX or equal to the longest on-duty, converter duty-ratio calculation unit 52A determines that on-duty D_ON_1 is not influenced by dead time Dt.

Then, in the case where converter duty-ratio calculation unit 52A determines that on-duty D_ON_1 is influenced by dead time Dt, converter duty-ratio calculation unit 52A sets on-duty D_ON_1 to maximum effective on-duty D_MAX or the longest on-duty.

In contrast, in the case where converter duty-ratio calculation unit 52A determines that on-duty D_ON_1 is not influenced by dead time Dt, converter duty-ratio calculation unit 52A uses on-duty D_ON_1 calculated by expression (1).

Figure 4:
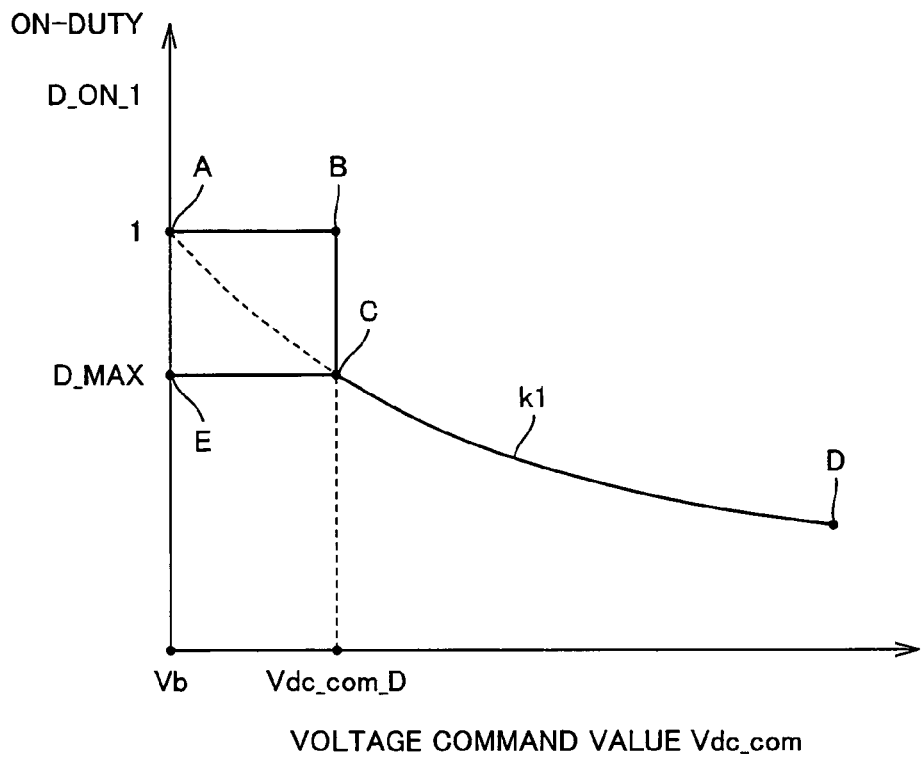
FIG. 4 shows a relation between on-duty D_ON_1 and voltage command value Vdc_com.

FIG. 4 shows a relation between on-duty D_ON_1 and voltage command value Vdc_com.

Referring to FIG. 4, when voltage command value Vdc_com is equal to DC voltage Vb from DC power supply B, on-duty D_ON_1 of NPN transistor Q1 is the longest on-duty. As voltage command value Vdc_com increases to become larger than DC voltage Vb, on-duty D_ON_1 decreases in inverse proportion to voltage command value Vdc_com according to expression (1). In other words, on-duty D_ON_1 decreases along curve k1.

In the region where on-duty D_ON_1 is larger than maximum effective on-duty D_MAX and smaller than the longest on-duty, on-duty D_ON_1 calculated based on voltage command value Vdc_com is partially occupied by dead time Dt and thus the original on-duty cannot be ensured. Then, in this case, on-duty D_ON_1 is set to the longest on-duty. In other words, in the region where voltage command value Vdc_com is equal to or larger than power supply voltage Vb and equal to or smaller than predetermined voltage Vdc_com_D (=Vb× T/T−Dt), on-duty D_ON_1 is set to the longest on-duty.

It is seen from equation Vdc_com_D=Vb×T/T−Dt that predetermined voltage Vdc_com_D is determined depending on dead time Dt.

In the above-described region, output voltage Vm of voltage step-up converter 12 oscillates and thus cannot be controlled linearly with respect to voltage command value Vdc_com. Therefore, on-duty D_ON_1 is set to the on-duty (=1) from which the influence of dead time Dt is removed.

Then, voltage command value Vdc_com reaches the value Vdc_com_D for which the linear control of output voltage Vm with respect of voltage command value Vdc_com can be conducted, and thereafter on-duties D_ON_1, D_ON_2 calculated based on voltage command value Vdc_com are used.

Referring again to FIG. 3, according to the above-described method, converter duty-ratio calculation unit 52A calculates on-duties D_ON_1, D_ON_2 of NPN transistors Q1, Q2 and outputs, as duty ratio DR, the ratio between on-duty D_ON_1 and on-duty D_ON_2 to converter PWM signal conversion unit 54.

Here, converter duty-ratio calculation unit 52A calculates the deviation (Vdc_com−Vm) between voltage command value Vdc_com and voltage Vm from voltage sensor 20 and then determines the duty ratio so that the calculated deviation (Vdc_com−Vm) is equal to zero.

Converter PWM signal conversion unit 54 generates, based on the duty ratio from converter duty-ratio calculation unit 52A, signal PWMU or signal PWMD for turning on/off NPN transistors Q1, Q2 of voltage step-up converter 12 and outputs the generated signal PWMU or PWMD to NPN transistors Q1, Q2 of voltage step-up converter 12. Further, converter PWM signal conversion unit 54 outputs carrier frequency fc of the generated signal PWMU or PWMD to converter duty-ratio calculation unit 52A.

On-duty D_ON_2 of NPN transistor Q2 which is the lower one included in voltage step-up converter 12 can be increased to increase electric-power storage of reactor L1, achieving a higher voltage output. In contrast, if on-duty D_ON_1 of the upper NPN transistor Q1 is increased, the voltage on the power supply line decreases. Accordingly, through control of duty ratio DR of NPN transistors Q1, Q2, the voltage on the power supply line can accordingly be controlled so that the voltage is set to an arbitrary voltage of at least the output voltage of DC power supply B.

Figure 5A:
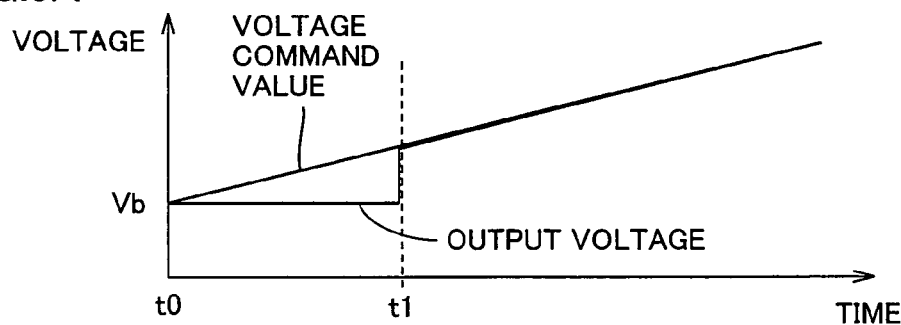
FIGS. 5A and 5B are timing charts respectively of voltage and on-duty D_ON_1 of an NPN transistor Q1 (upper arm).
Figure 5B:
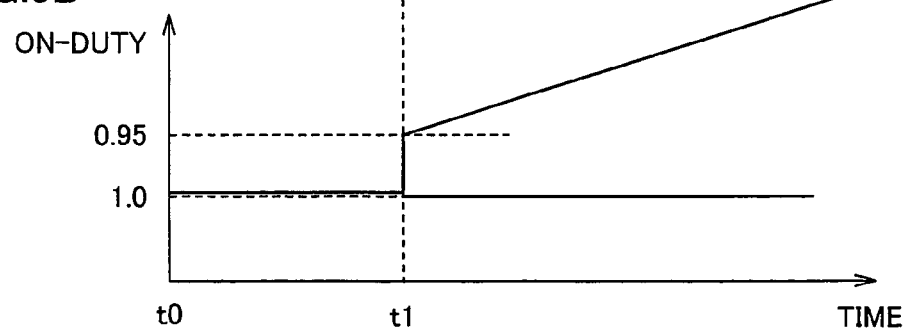

FIGS. 5A and 5B are timing charts of the voltage and on-duty D_ON_1 of NPN transistor Q1 (upper arm).

Referring to FIGS. 5A and 5B, in the case where a voltage step-up operation is carried out, voltage command value Vdc_com starts to increase at timing t0. In the period from timing t0 to timing t1, voltage command value Vdc_com is considerably close to DC voltage Vb that is output from DC power supply B. Therefore, on-duty D_ON_1 which is calculated based on voltage command value Vdc_com is influenced by dead time Dt.

Thus, in the period from timing t0 to timing t1, on-duty D_ON_1 is fixed at the longest on-duty (D_ON_1=1.0) from which the influence of dead time Dt is removed (see FIG. 5B); In this case, while output voltage Vm of voltage step-up converter 12 deviates from voltage command value Vdc_com, on-duty D_ON_1 is fixed at the longest on-duty. Then, in the state where on-duty D_ON_1 is fixed at the longest on-duty, the voltage step-up operation is carried out.

Output voltage Vm is accordingly held at DC voltage Vb in the period from timing t0 to timing t1 (see FIG. 5A).

Voltage command value Vdc_com thereafter further increases so that on-duty D_ON_1 calculated based on this voltage command value Vdc_com reaches for example 0.95. Then, on-duty D_ON_1 is not influenced by dead time Dt. Therefore, the voltage step-up operation is carried out using on-duty D_ON_1 and on-duty D_ON_2 calculated based on voltage command value Vdc_com.

If the voltage step-up operation intends to make output voltage Vm closer to DC voltage Vb, on-duty D_ON_1 is fixed at the longest on-duty in the period from timing t0 to timing t1 and changed linearly in other periods based on voltage command value Vdc_com.

Thus, for both of the voltage step-up and step-down operations, in the case where on-duty D_ON_1 of NPN transistor Q1 that is calculated based on voltage command value Vdc_com is influenced by dead time Dt, converter control means 302A controls switching of NPN transistors Q1, Q2 by fixing on-duty D_ON_1 at the on-duty from which the influence of dead time Dt is removed (longest on-duty). In the case where on-duty D_ON_1 is not influenced by dead time Dt, converter control means 302A controls switching of NPN transistors Q1, Q2 using on-duties D_ON_1 and D_ON_2 calculated based on voltage command value Vdc_com.

In the case where switching of NPN transistors Q1, Q2 is controlled by fixing on-duty D_ON_1 at the longest on-duty, converter control means 302A changes on-duty D_ON_1 along the path through point A, point B, point C and point D shown in FIG. 4.

Accordingly, as shown in FIGS. 5A and 5B, even in the region where the voltage step-up ratio is close to 1.0, namely voltage command value Vdc_com is closer to DC voltage Vb, disturbance of output voltage Vm of voltage step-up converter 12 and DC current Ib from DC power supply B can be suppressed.

With reference to FIGS. 5A and 5B, it is supposed here that voltage step-up converter 12 performs a voltage step-down operation. In this case, on-duty D_ON_1 suddenly increases from 0.95 to the longest on-duty (=1.0) around timing t1. As on-duty D_ON_1 suddenly increases, output voltage Vm suddenly decreases from a desired voltage command level (Vm=Vb/0.95) to DC voltage Vb.

The above-described phenomenon is now applied to motor drive apparatus 100 in FIG. 1. As terminal-to-terminal voltage Vm of capacitor 13 is instantaneously decreased to DC voltage Vb at timing t1, the storage energy of capacitor 13 corresponding to this decrease in voltage (Vm−Vb) flows, at a time, from capacitor 13 to DC power supply B.

At DC power supply B, at timing t1, DC current Ib increases as the energy is supplied from capacitor 13. Accordingly, DC voltage Vb increases by voltage ΔVb corresponding to the product of internal resistance Rb of DC power supply B and increase ΔIb of DC current Ib.

If the battery temperature of DC power supply B is in a normal temperature range, internal resistance Rb is relatively low. Therefore, voltage increase ΔVb is relatively small and influence on DC voltage Vb is accordingly small. In contrast, if the battery temperature is low that is out of the normal temperature range, internal resistance Rb of DC power supply B is fairly high and voltage increase ΔVb is relatively large. Thus, DC voltage Vb of DC power supply B exceeds a predetermined allowable voltage, resulting in deterioration in performance of DC power supply B.

Such deterioration of DC power supply B is effectively prevented as follows. In the stage of transition from the state where voltage step-up converter 12 performs its step-up operation (for example, on-duty D_ON_1=0.95) to the state where the voltage step-up operation is stopped (on-duty D_ON_1=1.0), if DC voltage Vb of DC power supply B may be increased to a considerably large extent, the voltage step-up operation is not stopped but continued.

Specifically, with reference to converter control means 302A shown in FIG. 3, converter duty-ratio calculation unit 52A outputs duty ratio DR of NPN transistors Q1, Q2 to converter PWM signal conversion unit 54 only when the voltage level of DC voltage Vb of DC power supply B is lower than a predetermined set value.

More specifically, receiving DC voltage Vb from voltage sensor 10, converter duty-ratio calculation unit 52A calculates on-duties D_ON_1 and D_ON_2 according to the above-described method and determines whether or not DC voltage Vb is smaller than predetermined set value Vb_lim. In other words, converter duty-ratio calculation unit 52A determines whether or not DC voltage Vb exceeds allowable maximum voltage Vb_MAX in response to a sudden change of on-duty D_ON_1. This predetermined set value Vb_lim is set in advance based on expression (3) and stored in converter duty-ratio calculation unit 52A.

$$Vb\_lim = Vb\_MAX - Ib\_max \times Rb\_max \quad (3)$$

In expression (3), Vb_MAX represents the allowable maximum voltage of DC power supply B and Ib_max represents the maximum value of DC current Ib when on-duty D_ON_1 changes from 0.95 to 1.0, namely the transition occurs to the state where the voltage step-up operation is stopped. As Ib_max, a calculation value is set that is calculated in advance using expression (4) that shows the relation between energy supplied from capacitor 13 and DC current Ib. Alternatively, it is set based on a measurement of DC current Ib that is obtained in advance.

$$Vm - Vb = 1/C \cdot (L \cdot dIb/dt + Rb \cdot Ib) \quad (4)$$

C represents capacitance of capacitor 13 and L represents inductance of reactor L1.

Rb_max in expression (3) represents the maximum value of internal resistance Rb of DC power supply B. Rb_max is set in advance together with the above-described maximum allowable voltage Vb_MAX based on the specification of DC power supply B mounted on motor drive apparatus 100.

When DC voltage Vb is equal to or larger than set value Vb_lim, converter duty-ratio calculation unit 52A determines that, if the operation makes a transition to the state where the voltage step-up operation is stopped, DC voltage Vb will exceed allowable maximum voltage Vb_MAX. Accordingly, this transition to the stopped state is not made. Specifically, converter duty-ratio calculation unit 52A fixes on-duty D_ON_1 at, for example, maximum effective duty D_MAX, for instructing that the voltage step-up operation should be carried out.

In contrast, when DC voltage Vb is smaller than set value Vb_lim, converter duty-ratio calculation unit 52A determines that, even if the voltage step-up operation is stopped, DC voltage Vb will not exceed allowable maximum voltage Vb_MAX. Accordingly the operation makes a transition to the state where the voltage step-up operation is stopped. Specifically, converter duty-ratio calculation unit 52A fixes on-duty D_ON_1 at the longest on-duty (=1) for instructing that the voltage step-up operation should be stopped.

In the case where on-duty D_ON_1 is fixed at maximum effective on-duty D_MAX to control switching of NPN transistors Q1, Q2, converter control means 302A changes on-duty D_ON_1 along the path through point A, point E, point C and point D shown in FIG. 4.

Maximum effective on-duty D_MAX is determined by expression (2). Here, since control period length T in expression (2) is determined by carrier frequency fc in controlling switching of NPN transistors Q1, Q2, maximum effective on-duty D_MAX may be changed depending on carrier frequency fc.

Alternatively, since switching loss of NPN transistors Q1, Q2 has connection with carrier frequency fc, maximum effective on-duty D_MAX may be determined in consideration of carrier frequency fc and switching loss.

Figure 6:
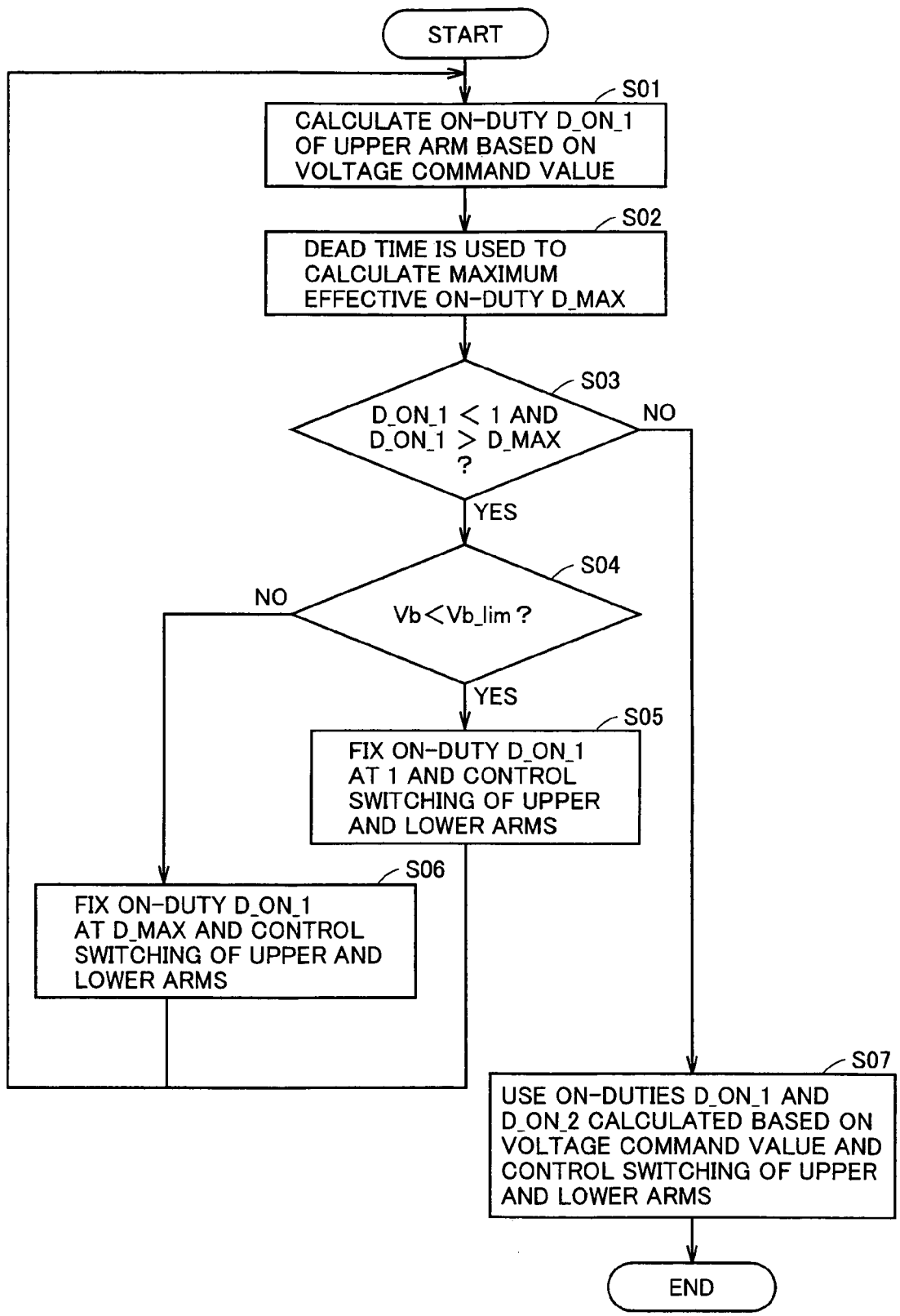
FIG. 6 is a flowchart illustrating an operation of the converter control means in FIG. 3 that controls voltage conversion by a voltage step-up converter.

FIG. 6 is a flowchart illustrating an operation of converter control means 302A that controls voltage conversion by voltage step-up converter 12.

Referring to FIG. 6, on the start of a series of operations, converter duty-ratio calculation unit 52A calculates, based on voltage command value Vdc_com from voltage command calculation unit 50 and DC voltage Vb from voltage sensor 10, on-duty D_ON_1 of NPN transistor Q1 (upper arm) according to expression (1) (step S01).

Then, converter duty-ratio calculation unit 52A receives carrier frequency fc from converter PWM signal conversion unit 54 to calculate control period length T determined by the received carrier frequency fc. Converter duty-ratio calculation unit 52A substitutes control period length T and dead time Dt into expression (2) to calculate maximum effective on-duty D_MAX (step S02).

Converter duty-ratio calculation unit 52A thereafter determines whether or not on-duty D_ON_1 is larger than maximum effective on-duty D_MAX and smaller than the longest on-duty (step S03). In other words, converter duty-ratio calculation unit 52A determines whether or not on-duty D_ON_1 is influenced by dead time Dt.

If on-duty D_ON_1 is larger than maximum effective on-duty D_MAX and smaller than the longest on-duty, converter duty-ratio calculation unit 52A determines that on-duty D_ON_1 is influenced by dead time Dt. Converter duty-ratio calculation unit 52A subsequently determines whether or not DC voltage Vb is smaller than set value Vb_lim (step S04). In other words, converter duty-ratio calculation unit 52A determines whether or not there is a possibility that DC voltage B will be deteriorated.

When DC voltage Vb is smaller than set value Vb_lim, converter duty-ratio calculation unit 52A determines that DC power supply B will not be deteriorated and sets on-duty D_ON_1 to the longest on-duty. Then, based on the set on-duty D_ON_1, converter duty-ratio calculation unit 52A calculates on-duty D_ON_2 (=1−D_ON_1).

Converter duty-ratio calculation unit 52A outputs to converter PWM signal conversion unit 54 the ratio between on-duty D_ON_1 (=1) and on-duty D_ON_2 (=0), as duty ratio DR.

Based on duty ratio DR from converter duty-ratio calculation unit 52A, converter PWM signal conversion unit 54 generates signal PWMU or signal PWMD to output the generated signal to NPN transistors Q1 and Q2. Accordingly, switching of NPN transistors Q1, Q2 is controlled with on-duty D_ON_1 set to the longest on-duty (step S05).

In contrast, when DC voltage Vb is equal to or larger than set value Vb_lim, converter duty-ratio calculation unit 52A determines that DC power supply B may be deteriorated and sets on-duty D_ON_1 to maximum effective on-duty D_MAX. Based on the set on-duty D_ON_1, converter duty-ratio calculation unit 52A calculates on-duty D_ON_2 (=1−D_ON_1).

Converter duty-ratio calculation unit 52A outputs to converter PWM signal conversion unit 54 the ratio between on-duty D_ON_1 (=D_MAX) and on-duty D_ON_2 (=1−D_MAX) as duty ratio DR.

Based on duty ratio DR from converter duty-ratio calculation unit 52A, converter PWM signal conversion unit 54 generates signal PWMU or signal PWMD to output the signal to NPN transistors Q1, Q2. In this way, switching of NPN transistors Q1, Q2 is controlled with on-duty D_ON_1 set to the longest on-duty (step S06).

After this, until on-duty D_ON_1 reaches maximum effective on-duty D_MAX, on-duty D_ON_1 is fixed at the longest on-duty or maximum effective on-duty D_MAX and steps S01 to S07 are repeatedly carried out. When on-duty D_ON_1 reaches maximum effective on-duty D_MAX and it is determined in step S03 that on-duty D_ON_1 is equal to or smaller than maximum effective on-duty D_MAX or equal to the longest on-duty, converter duty-ratio calculation unit 52A calculates the ratio between on-duty D_ON_1 and on-duty D_ON_2 calculated based on voltage command value Vdc_com as duty ratio DR to output the calculated duty ratio to converter PWM signal conversion unit 54.

Converter PWM signal conversion unit 54 generates signal PWMU or signal PWMD based on duty ratio DR from converter duty-ratio calculation unit 52A to output the generated signal to NPN transistors Q1, Q2. Accordingly, switching of NPN transistors Q1, Q2 is controlled using on-duty D_ON_1 and on-duty D_ON_2 calculated based on voltage command value Vdc_com (step S07). The series of operations are accordingly completed.

In the flowchart in FIG. 6, the determination as to which of DC voltage Vb and set value Vb_lim is larger as shown in step S04 may alternatively be made according to the methods in first and second modifications indicated below. Respective motor drive apparatuses in the first and second modifications are those including converter control means 302B, 302C instead of converter control means 302A in control device 30 of motor drive apparatus 100 in FIG. 1. Therefore, the description of common components and characteristics is not repeated.

First Modification

Figure 7:
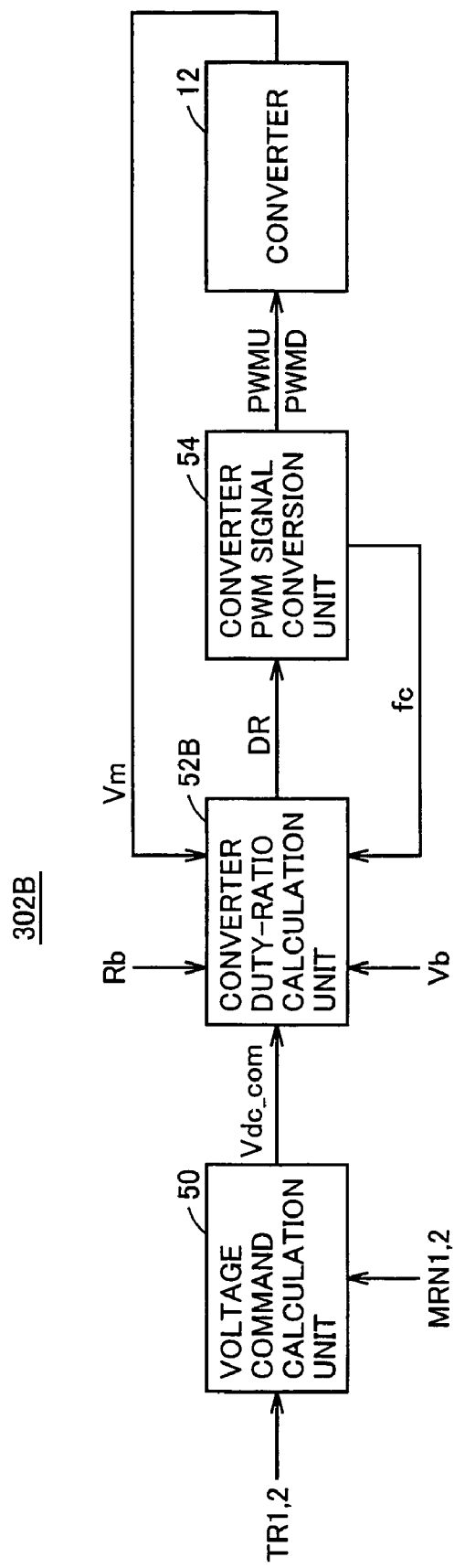
FIG. 7 is a functional block diagram of converter control means of the motor drive apparatus according to a first modification of the first embodiment of the present invention.

FIG. 7 is a functional block diagram of converter control means 302B of the motor drive apparatus in a first modification of the first embodiment of the present invention. Referring to FIG. 7, converter control means 302B includes a converter duty-ratio calculation unit 52B instead of converter duty-ratio calculation unit 52A of converter control means 302A in FIG. 3.

Converter duty-ratio calculation unit 52B receives voltage command value Vdc_com from voltage command calculation unit 50, DC voltage Vb from voltage sensor 10, internal resistance Rb from a battery ECU (not shown), output voltage Vm from voltage step-up converter 12, and carrier frequency fc from converter PWM signal conversion unit 54. Based on voltage command value Vdc_com and DC voltage Vb, converter duty-ratio calculation unit 52B calculates on-duties D_ON_1 and D_ON_2 of voltage step-up converter 12 according to the above-described method.

Further, converter duty-ratio calculation unit 52B determines whether or not on-duty D_ON_1 calculated based on voltage command value Vdc_com is influenced by dead time Dt. The specific method of this determination is the same as the method of determination (corresponding to step S03 in FIG. 6) made by converter duty-ratio calculation unit 52A described above.

Furthermore, when converter duty-ratio calculation unit 52B determines that on-duty D_ON_1 is influenced by dead time Dt, converter duty-ratio calculation unit 52B determines, according to the method described below, whether or not there is a possibility that DC voltage Vb will be deteriorated.

Converter duty-ratio calculation unit 52B determines whether or not DC voltage Vb is smaller than set value Vb_lim. The present modification differs from converter duty-ratio calculation unit 52A in the method of setting this set value Vb_lim.

More specifically, converter duty-ratio calculation unit 52B sets this set value Vb_lim based on expression (5).

$$Vb\_lim = Vb\_MAX - Ib\_max \times Rb \qquad (5)$$

Vb_MAX and Ib_max in expression (5) are common to expression (5) and aforementioned expression (3). In particular, Ib_max is set based on the calculation value determined in advance using expression (4) or the measurement of DC current Ib.

Further, in expression (5), Rb is an actual measurement of internal resistance Rb of DC power supply B. The actual measurement of internal resistance Rb is, as shown in FIG. 7, provided as battery information from the battery ECU (not shown).

The reason why the present modification uses the actual measurement of internal resistance Rb for making the determination as to DC voltage Vb is as follows. Converter duty-ratio calculation unit 52A in FIG. 3 uses maximum value Rb_max of internal resistance Rb of DC power supply B to determine increase in voltage ΔVb as indicated by expression (3). Accordingly, the worst state (corresponding to the state where internal resistance Rb is the maximum) is taken into consideration all the time and the determination is made as to whether or not the transition to the state of stopping the voltage step-up operation (on-duty D_ON__1=1) can be made. Therefore, there arises the case where the transition cannot be made to the state where the voltage step-up operation is stopped while this transition should actually be made since internal resistance Rb is relatively small. Then, in the present modification, converter duty-ratio calculation unit 52B uses battery information (internal resistance Rb) of the battery ECU to determine whether or not DC power supply B may be deteriorated. Thus, oscillation of output voltage Vm and DC current Ib can more precisely be reduced and DC power supply B can be prevented from being broken.

Converter duty-ratio calculation unit 52B determines whether or not DC voltage Vb is smaller than set value Vb_lim that is set according to the above-described method and, according to the result of the determination, sets on-duty D_ON__1 to the longest on-duty or maximum effective on-duty D_MAX. Then, converter duty-ratio calculation unit 52B outputs duty ratio DR that is the ratio between on-duty D_ON__1 (=1 or D_MAX) and on-duty D_ON__2 (=0 or 1−D_MAX) to converter PWM signal conversion unit 54.

Second Modification

Figure 8:
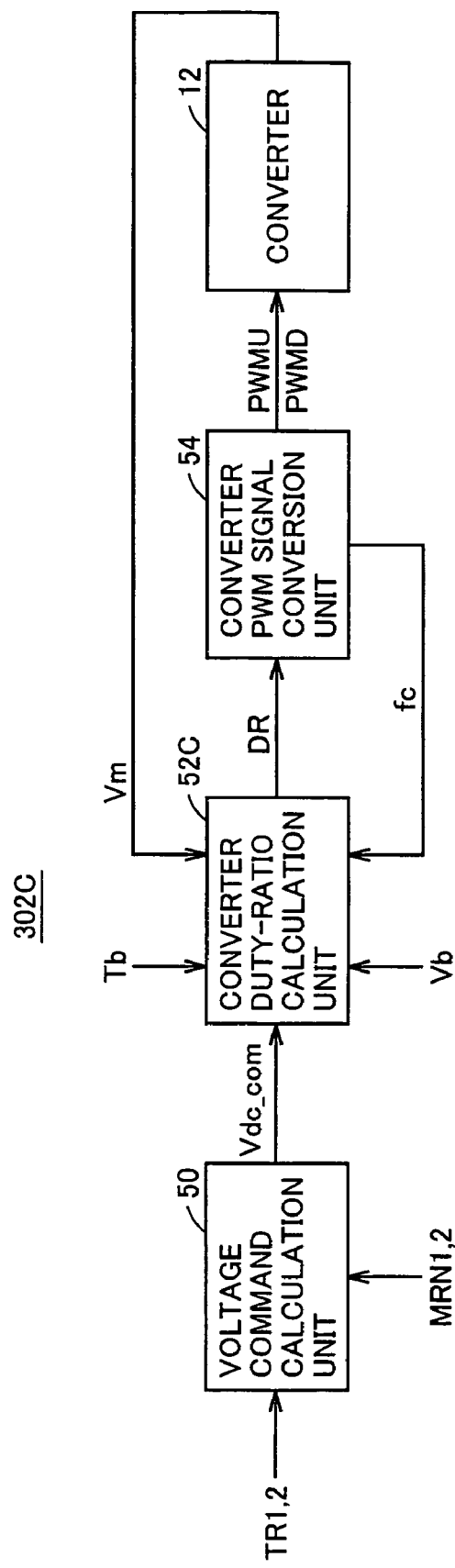
FIG. 8 is a functional block diagram of converter control means of the motor drive apparatus according to a second modification of the first embodiment of the present invention.

FIG. 8 is a functional block diagram of converter control means 302C of the motor drive apparatus in a second modification of the first embodiment of the present invention. Referring to FIG. 8, converter control means 302C includes a converter duty-ratio calculation unit 52C instead of converter duty-ratio calculation unit 52A of converter control means 302A in FIG. 3.

Converter duty-ratio calculation unit 52C receives voltage command value Vdc_com from voltage command calculation unit 50, DC voltage Vb from voltage sensor 10, battery temperature Tb from a temperature sensor (not shown) that detects the battery temperature of DC power supply B, output voltage Vm from voltage step-up converter 12, and carrier frequency fc from converter PWM signal conversion unit 54. Then, based on voltage command value Vdc_com and DC voltage Vb, converter duty-ratio calculation unit 52C calculates on-duties D_ON__1 and D_ON__2 of NPN transistors Q1 and Q2 of voltage step-up converter 12 according to the above-described method.

Further, converter duty-ratio calculation unit 52C determines whether or not on-duty D_ON__1 calculated based on voltage command value Vdc_com is influenced by dead time Dt. The specific method of this determination is the same as the method of determination (corresponding to step S03 in FIG. 6) made by the above-described converter duty-ratio calculation unit 52A.

Furthermore, when converter duty-ratio calculation unit 52C determines that on-duty D_ON__1 is influenced by dead time Dt, converter duty-ratio calculation unit 52C determines, according to the method described below, whether or not there is a possibility that DC voltage Vb will be deteriorated.

Converter duty-ratio calculation unit 52C determines whether or not DC voltage Vb is smaller than set value Vb_lim. The present modification differs from converter duty-ratio calculation units 52A, 52B in terms of the method of setting this set value Vb_lim.

More specifically, converter duty-ratio calculation unit 52C sets this set value Vb_lim based on the aforementioned expression (5). A feature of the present modification is that converter duty-ratio calculation unit 52C estimates internal resistance Rb in expression (5) based on battery temperature Tb from the temperature sensor.

While the first modification is configured to use the actual measurement of internal resistance Rb to be used as Rb in expression (5), the present modification provides means for estimating internal resistance Rb to converter duty-ratio calculation unit 52C since any simple battery ECU does not have means for measuring or estimating internal resistance Rb.

The means for estimating internal resistance Rb is provided by storing, in converter duty-ratio conversion unit 52, the correlation between internal resistance Rb and battery temperature Tb in the form of a map or conversion formula, since internal resistance Rb of DC power supply B depends on battery temperature Tb to a large degree. Based on internal resistance Rb correlated with battery temperature Tb detected by the temperature sensor, converter duty-ratio calculation unit 52C calculates set value Vb_lim. Then, converter duty-ratio calculation unit 52C determines whether or not DC voltage Vb is smaller than the calculated set value Vb_lim and, according to the result of the determination, sets on-duty D_ON__1 to the longest on-duty or maximum effective on-duty D_MAX. Converter duty-ratio calculation unit 52C outputs, to converter PWM signal conversion unit 54, duty ratio DR that is the ratio between on-duty D_ON__1 (=1 or D_MAX) and on-duty D_ON__2 (=0 or 1−D_MAX).

According to the first embodiment and its first and second modifications, maximum value Ib_max of DC current Ib which is included in expressions (3) and (5) and based on which the operation makes a transition to the state where the voltage step-up operation is stopped, is set based on the value calculated in advance using expression (4) indicating the relation between energy supplied from capacitor 13 and DC current Ib or set based on the measurement of DC current Ib taken in advance. However, maximum value Ib_max may be calculated based on output voltage Vm received from voltage step-up converter 12, in parallel with the calculation of on-duties D_ON__1, D_ON__2 in each of converter duty-ratio calculation units 52A to 52C, to further enhance precision of control of converter control means 302A to 302C.

In the case where motor drive apparatus 100 shown in FIG. 1 is mounted on a hybrid vehicle, motor generator MG1 is coupled to the engine through a power split device and motor generator MG2 is coupled to front wheels (drive wheels) through the power split device. Voltage step-up converter 12 performs the voltage step-down operation under the condition that the brake pedal is depressed while the hybrid vehicle is running to stop motor generator MG1 and thereby decrease voltage to be supplied to motor generator MG2 or the condition that power generation by motor generator MG1 is stopped while the hybrid vehicle is running at a low speed to decrease voltage to be supplied to motor generator MG2. Under such a condition, converter control means 302A to 302C controls voltage step-up converter 12 to decrease output voltage Vm to voltage command value Vdc_com by varying on-duty D_ON_1 along the path through point D, point C, point B and point A or the path through point D, point C, point E and point A shown in FIG. 4 according to the level of DC voltage Vb. Accordingly, even when the hybrid vehicle is decelerating or running at a low speed, oscillation of output voltage Vm and DC current Ib can be reduced and DC power supply B can be prevented from being broken.

Moreover, control of voltage conversion by converter control means 302A to 302C of control device 30 is actually performed by a CPU (Central Processing Unit). The CPU reads from a ROM (Read-Only Memory) a program including the steps of the flowchart shown in FIG. 6, executes the read program and controls the voltage conversion following the flowchart shown in FIG. 6. Therefore, the ROM corresponds to a computer (CPU)-readable recording medium having the program recorded thereon that includes the steps of the flowchart shown in FIG. 6.

In addition, voltage step-up converter 12 and control device 30 correspond to "voltage conversion device."

Further, NPN transistor Q1 corresponds to "upper arm" and NPN transistor Q2 corresponds to "lower arm."

Furthermore, maximum effective on-duty D_MAX refers to "appropriate on-duty."

Second Embodiment

In the embodiment described above, in the case where on-duty D_ON_1 is influenced by dead time Dt, converter control means 302A to 302C make the transition to the state where the voltage step-up operation is stopped under the condition that it is determined DC power supply B will not be deteriorated. Accordingly, it is avoided that DC power supply B is damaged due to a sudden increase in DC current Ib in the transition to the state where the voltage step-up operation is stopped.

Alternatively, DC power supply B may be protected from the sudden increase (hereinafter also referred to as surge) of DC current Ib by allowing on-duty D_ON_1 to be controlled linearly.

Then, the present embodiment discloses a voltage conversion device capable of linearly controlling on-duty D_ON_1.

Figure 9:
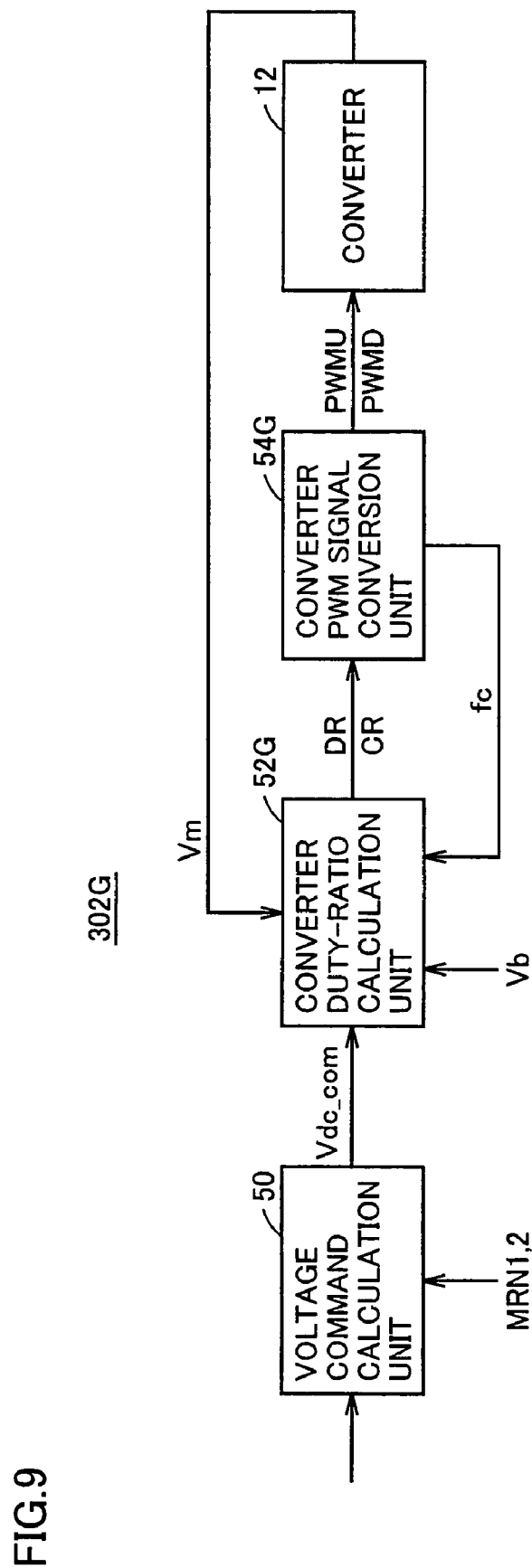
FIG. 9 is a functional block diagram of converter control means of a motor drive apparatus according to a second embodiment of the present invention.

FIG. 9 is a functional block diagram of converter control means 302G of a motor drive apparatus according to the second embodiment of the present invention. Referring to FIG. 9, converter control means 302G includes a converter duty-ratio calculation unit 52G and a converter PWM signal conversion unit 54G instead of converter duty-ratio calculation unit 52A and converter PWM signal conversion unit 54 of converter control means 302A in FIG. 3.

Converter duty-ratio calculation unit 52G receives voltage command value Vdc_com from voltage command calculation unit 50, DC voltage Vb from voltage sensor 10, internal resistance Rb from a battery ECU (not shown), output voltage Vm from voltage step-up converter 12, and carrier frequency fc from converter PWM signal conversion unit 54G. Based on voltage command value Vdc_com and DC voltage Vb, converter duty-ratio calculation unit 52G calculates on-duties D_ON_1 and D_ON_2 of NPN transistors Q1 and Q2 of voltage step-up converter 12 according to expression (1) described above. Further, based on carrier frequency fc, converter duty-ratio calculation unit 52G calculates maximum effective on-duty D_MAX of NPN transistor Q1 from which influence of dead time Dt is removed according to expression (2). In the present embodiment, it is supposed that the calculated maximum effective on-duty D_MAX is 0.95.

Then, converter duty-ratio calculation unit 52G determines whether or not on-duty D_ON_1 calculated based on voltage command value Vdc_com is influenced by dead time Dt. The specific method of this determination is the same as the method of determination (corresponding to step S03 in FIG. 6) made by above-described converter duty-ratio calculation unit 52A. Specifically, converter duty-ratio calculation unit 52G determines, when the calculated on-duty D_ON_1 is larger than maximum effective on-duty D_MAX and smaller than the longest on-duty, on-duty D_ON_1 is influenced by dead time Dt. When on-duty D_ON_1 is equal to or smaller than maximum effective on-duty D_MAX or equal to the longest on-duty, converter duty-ratio calculation unit 52G determines that on-duty D_ON_1 is not influenced by the dead time.

When converter duty-ratio calculation unit 52G determines that on-duty D_ON_1 is influenced by dead time Dt, converter duty-ratio calculation unit 52G sets on-duty D_ON_1 using maximum effective on-duty D_MAX and the longest on-duty.

Specifically, converter duty-ratio calculation unit 52G makes a switch between maximum effective on-duty D_MAX and the longest on-duty (=1) to satisfy a predetermined ratio CR in order to allow a finally obtained on-duty to be equal to on-duty D_ON_1 calculated based on voltage command value Vdc_com. In this case, converter duty-ratio calculation unit 52G sets this predetermined ratio CR to satisfy the relation defined in expression (6):

$$D\_ON\_1 = D\_MAX \times z + 1 \times (1-z) \quad (6)$$

where z is the ratio at which maximum effective on-duty D_MAX is used (z is an arbitrary value of at least 0 and at most 1) and D_MAX is 0.95.

For example, when on-duty D_ON_1 calculated based on voltage command value Vdc_com is 0.96, z is determined to be equal to 0.8 (z=0.8) from expression (6). Specifically, switching can be made between maximum effective on-duty D_MAX and the longest on-duty (=1) to satisfy a ratio of 4:1, and thus desired on-duty D_ON_1=0.96 can be obtained.

In this case, converter duty-ratio calculation unit 52G outputs the set predetermined ratio CR (namely D_MAX (=0.95):longest on-duty (=1)=4:1) to converter PWM signal conversion unit 54G.

In contrast, when converter duty-ratio calculation unit 52G determines that on-duty D_ON_1 is not influenced by dead time Dt, converter duty-ratio calculation unit 52G uses on-duty D_ON_1 calculated according to expression (1). Then, converter duty-ratio calculation unit 52A outputs duty ratio DR between on-duty D_ON_1 and on-duty D_ON_2 to converter PWM signal conversion unit 54G.

Here, converter duty-ratio calculation unit 52G calculates the deviation (Vdc_com−Vm) between voltage command value Vdc_com and voltage Vm from voltage sensor 20 and calculates duty ratio DR so that the calculated deviation (Vdc_com−Vm) is equal to zero.

Figure 10:
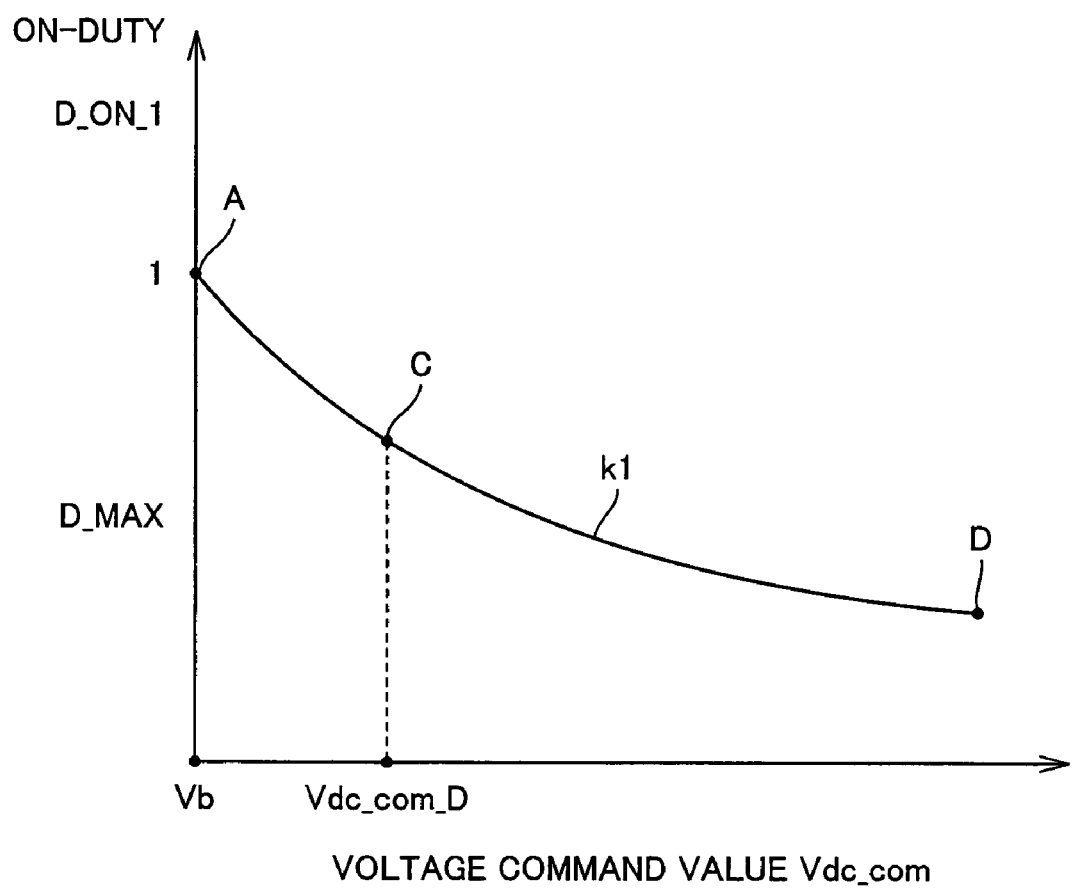
FIG. 10 shows a relation between on-duty D_ON_1 and voltage command value Vdc_com.

FIG. 10 shows a relation between on-duty D_ON_1 and voltage command value Vdc_com.

Referring to FIG. 10, when voltage command value Vdc_com is equal to DC voltage Vb that is output from DC power supply B, on-duty D_ON_1 of NPN transistor Q1 is the longest on-duty. As voltage command value Vdc_com increases to be larger than DC voltage Vb, on-duty D_ON_1 decreases inversely with voltage command value Vdc_com as seen from expression (1). In other words, on-duty D_ON_1 decreases along curve k1.

In the region where on-duty D_ON_1 is larger than maximum effective on-duty D_MAX and smaller than the longest on-duty, on-duty D_ON_1 calculated based on voltage command value Vdc_com is partially occupied by dead time Dt and thus the original on-duty cannot be ensured. Therefore, in this case, switching of on-duty D_ON_1 is made between maximum effective on-duty D_MAX and the longest on-duty at predetermined ratio CR. Accordingly, even in the region where voltage command value Vdc_com is equal to or larger than power supply voltage Vb and equal to or smaller than predetermined voltage Vdc_com_D (=Vb×T/T−Dt), on-duty D_ON_1 decreases along curve k1. Thus, even in this region, output voltage Vm of voltage step-up converter 12 can be controlled linearly with respect to voltage command value Vdc_com without influence of dead time Dt.

After voltage command value Vdc_com reaches predetermined voltage Vdc_com_D, on-duties D_ON_1, D_ON_2 calculated based on voltage command value Vdc_com are used.

Since Vdc_com_D is equal to Vb×T/T−Dt, predetermined voltage Vdc_com_D is determined depending on dead time Dt.

Referring again to FIG. 9, based on duty ratio DR or predetermined ratio CR from converter duty-ratio calculation unit 52G, converter PWM signal conversion unit 54G generates signal PWMU or signal PWMD for turning on/off NPN transistors Q1, Q2 and outputs the generated signal PWMU or PWMD to NPN transistors Q1, Q2 of voltage step-up converter 12. Converter PWM signal conversion unit 54G outputs carrier frequency fc of the generated signal PWMU or PWMD to converter duty-ratio calculation unit 52G.

Figure 11:
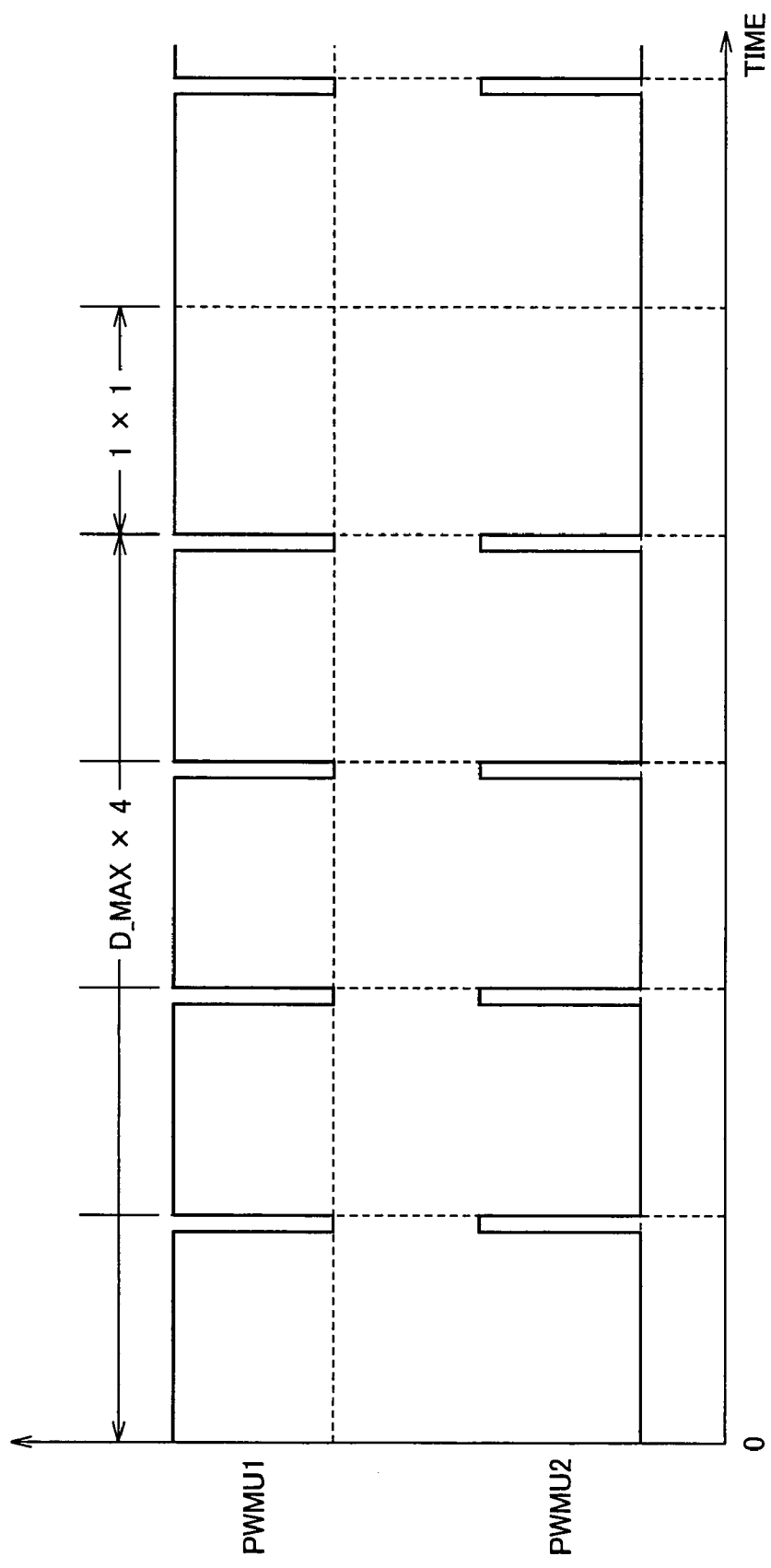
FIG. 11 is a timing chart of signal PWMU generated based on predetermined ratio CR by a converter PWM signal conversion unit.

FIG. 11 is a timing chat of signal PWMU generated based on predetermined ratio CR by converter PWM signal conversion unit 54G.

Referring to FIG. 11, signal PWMU1 is input to the gate terminal of NPN transistor Q1 of voltage step-up converter 12 while signal PWMU2 is input to the gate terminal of NPN transistor Q2. Signals PWMU1, PWMU2 are signals generated by converter PWM signal conversion unit 54G when on-duty D_ON_1 calculated based on voltage command value Vdc_com is 0.96 and predetermined ratio CR is (D_MAX(=0.95):1=4:1).

As clearly seen from FIG. 11, signal PWMU1 is comprised of maximum effective on-duty D_MAX for total four control period lengths T and the longest on-duty (=1) for one control period length T. Accordingly, NPN transistor Q1 is ON, in each control period length T, at maximum effective on-duty D_MAX or the longest on-duty (=1). Then, through five control period lengths T, desired on-duty D_ON_1 of 0.96 is finally achieved.

Figure 12A:
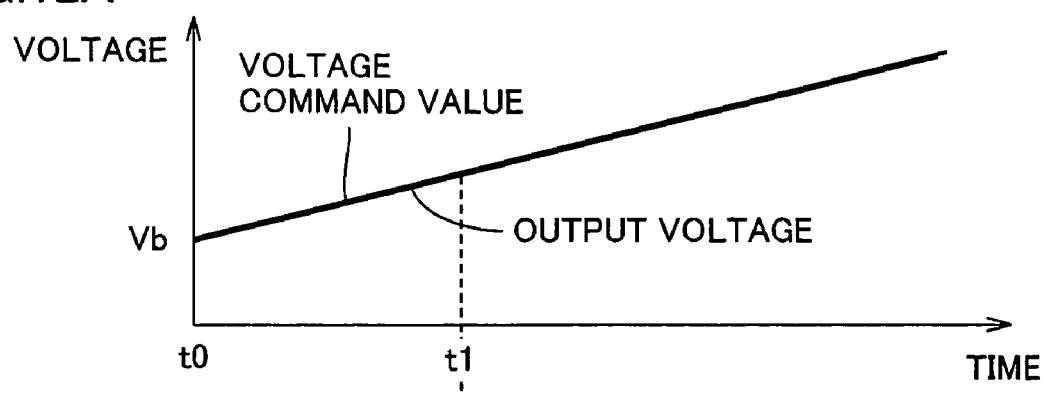
FIGS. 12A and 12B are timing charts respectively of a voltage and on-duty D_ON_1 of an NPN transistor Q1 (upper arm).
Figure 12B:
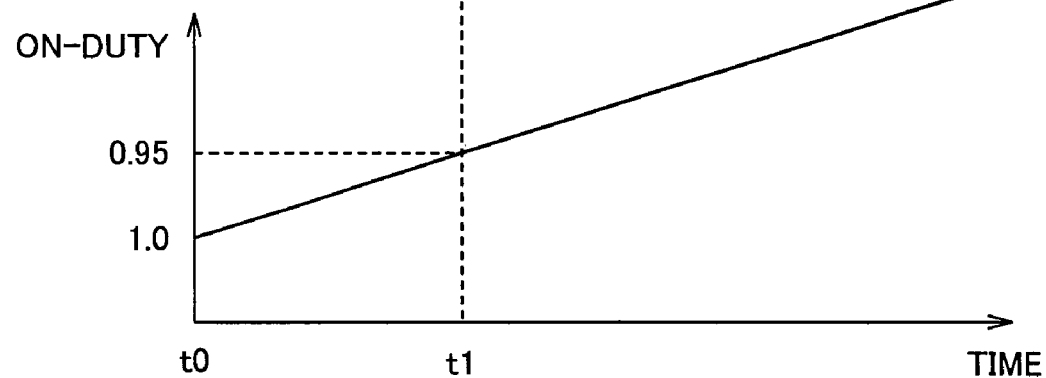

FIGS. 12A and 12B are timing charts respectively of the voltage and on-duty D_ON_1 of NPN transistor Q1 (upper arm).

Referring to FIGS. 12A and 12B, in the case where a voltage step-up operation is performed, voltage command value Vdc_com starts to increase at timing t0. In the period from timing t0 to timing t1, on-duty D_ON_1 calculated based on voltage command value Vdc_com is influenced by dead time Dt.

Therefore, on-duty D_ON_1 is set by being switched between maximum effective on-duty D_MAX (for example 0.95) and the longest on-duty (=1) at predetermined ratio CR in the period from timing t0 to timing t1. Thus, as shown in FIG. 12B, the voltage is stepped up while on-duty D_ON_1 is controlled linearly.

Accordingly, output voltage Vm matches voltage command value Vdc_com in the period from timing t0 to timing t1 and linearly changed as voltage command value Vdc_com increases.

Thus, in the region where the voltage step-up ratio is around 1.0 and voltage command value Vdc_com is close to DC voltage Vb, disturbance of output voltage Vm of voltage step-up converter 12 and DC current Ib can be suppressed.

Figure 13:
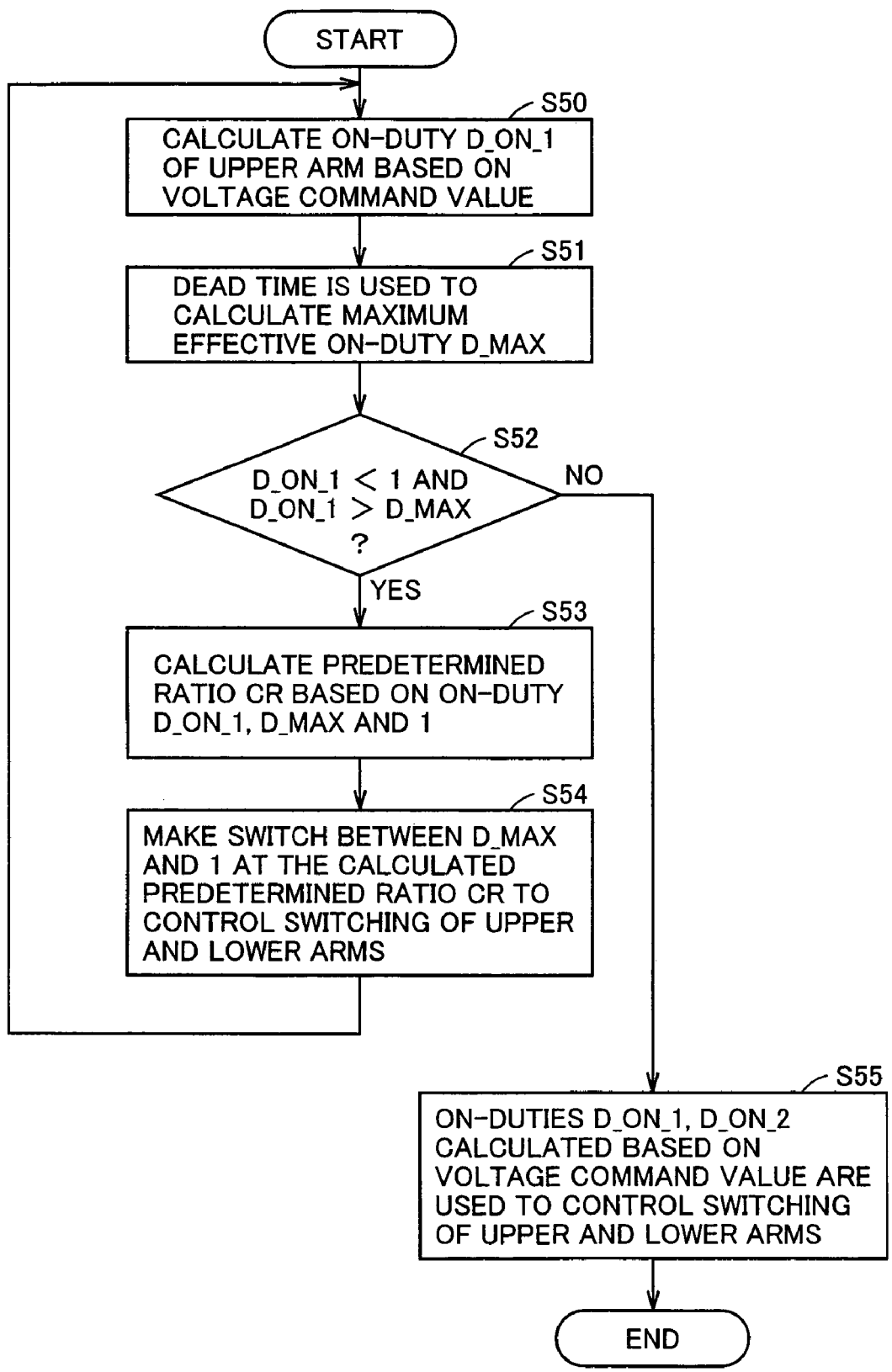
FIG. 13 is a flowchart illustrating an operation of converter control means controlling voltage conversion by a voltage step-up converter.

FIG. 13 is a flowchart illustrating an operation of converter control means 302G of controlling voltage conversion by voltage step-up converter 12.

Referring to FIG. 13, on the start of a series of operations, converter duty-ratio calculation unit 52G calculates, based on voltage command value Vdc_com from voltage command calculation unit 50 and DC voltage Vb from voltage sensor 10, on-duty D_ON_1 of NPN transistor Q1 (upper arm) according to expression (1) (step S50).

Then, converter duty-ratio calculation unit 52G receives carrier frequency fc from converter PWM signal conversion unit 54G to calculate control period length T determined by the received carrier frequency fc. Converter duty-ratio calculation unit 52G substitutes control period length T and dead time Dt into expression (2) to calculate maximum effective on-duty D_MAX (step S51);

Converter duty-ratio calculation unit 52G thereafter determines whether or not on-duty D_ON_1 is larger than maximum effective on-duty D_MAX and smaller than the longest on-duty (step S52). In other words, converter duty-ratio calculation unit 52G determines whether or not on-duty D_ON_1 is influenced by dead time Dt.

If on-duty D_ON_1 is larger than maximum effective on-duty D_MAX and smaller than the longest on-duty, converter duty-ratio calculation unit 52G determines that on-duty D_ON_1 is influenced by dead time Dt and substitutes on-duty D_ON_1, maximum effective on-duty D_MAX and the longest on-duty (=1) into expression (6) to calculate predetermined ratio CR (step S53). Then, converter duty-ratio calculation unit 52G outputs the calculated predetermined ratio CR to converter PWM signal conversion unit 54G.

Converter PWM signal conversion unit 54G generates signal PWMU or PWMD based on predetermined ratio CR from converter duty-ratio calculation unit 52G and outputs the generated signal to NPN transistors Q1, Q2. Accordingly, switching of NPN transistors Q1, Q2 is controlled by making a switch between maximum effective on-duty D_MAX and the longest on-duty at predetermined ratio CR (step S54).

After this, until on-duty D_ON_1 reaches maximum effective on-duty D_MAX, the switch is made between the longest on-duty and maximum effective on-duty D_MAX at predetermined ratio CR and steps S50 to S54 are repeatedly carried out. Then, when on-duty D_ON_1 reaches maximum effective on-duty D_MAX and it is determined in step S52 that on-duty D_ON_1 is equal to or smaller than maximum effective on-duty D_MAX or equal to the longest on-duty, converter duty-ratio calculation unit 52G calculates duty ratio DR that is the ratio between on-duty D_ON_1 and on-duty D_ON_2 calculated based on voltage command value Vdc_com, and outputs the calculated duty ratio DR to converter PWM signal conversion unit 54G.

Based on duty ratio DR from converter duty-ratio calculation unit 52G, converter PWM signal conversion unit 54G generates signal PWMU or signal PWMD and outputs the generated signal to NPN transistors Q1, Q2. Accordingly, switching of NPN transistors Q1, Q2 is controlled using on-duties D_ON_1, D_ON_2 determined based on voltage command value Vdc_com (step S55). The series of operations is thus completed.

Here, with reference to the flowchart in FIG. 13, the determination as to whether or not on-duty D_ON_1 is influenced by dead time Dt shown in step S52 may be made according to the method described in connection with a first modification below.

First Modification

Figure 14:
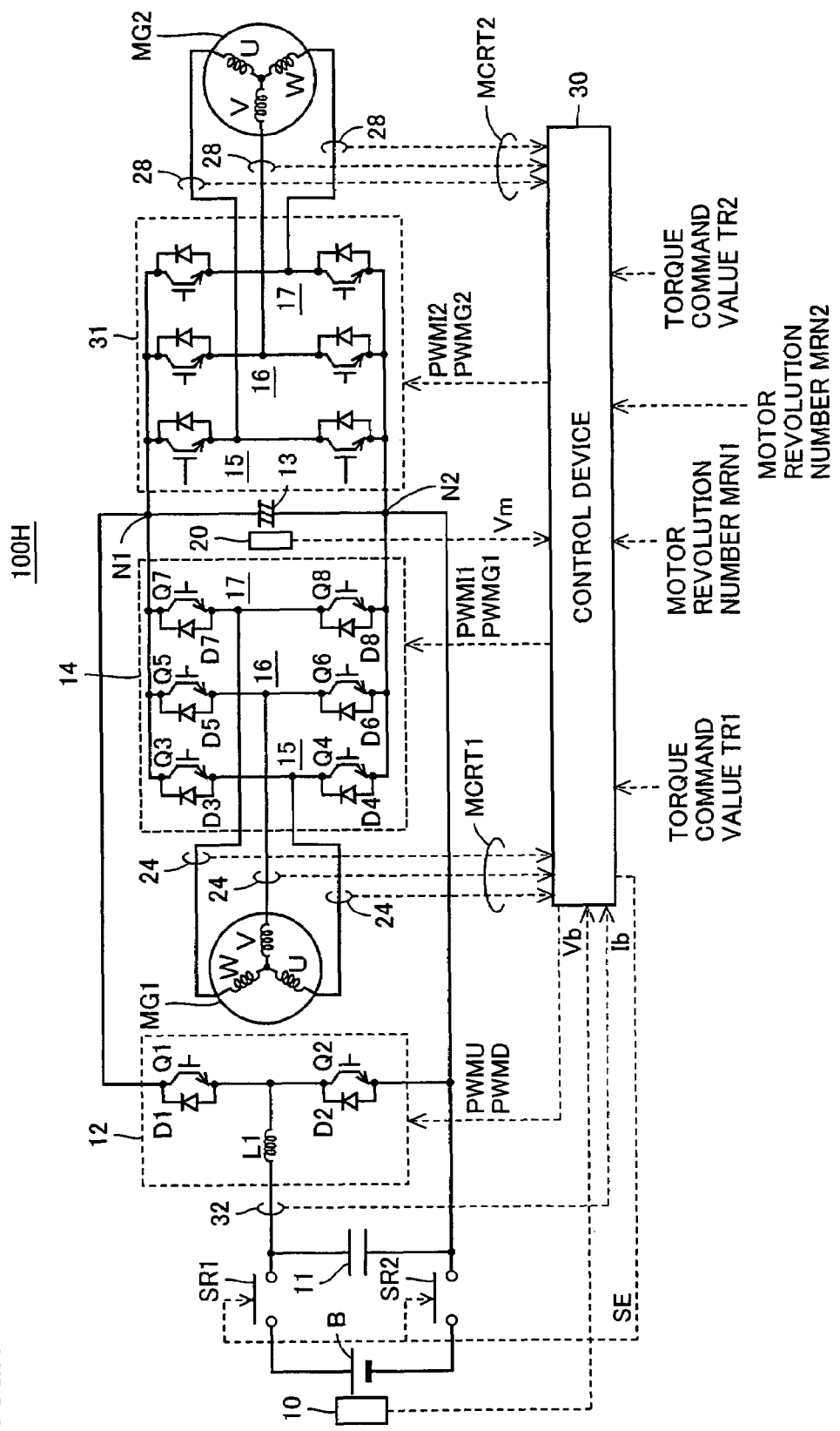
FIG. 14 is a schematic block diagram of the motor drive apparatus having a voltage conversion device according to a first modification of the second embodiment of the present invention.

FIG. 14 is a schematic block diagram of a motor drive apparatus having a voltage conversion device according to a first modification of the second embodiment of the present invention.

Referring to FIG. 14, motor drive apparatus 100H additionally includes a current sensor 32 for detecting DC current Ib as compared with motor drive apparatus 100 in FIG. 1. Current sensor 32 detects DC current Ib and outputs the detected DC current Ib to control device 30.

Control device 30 in this modification includes converter control means 302H instead of converter control means 302G in FIG. 9. Thus, the detailed description of common components is not repeated.

Figure 15:
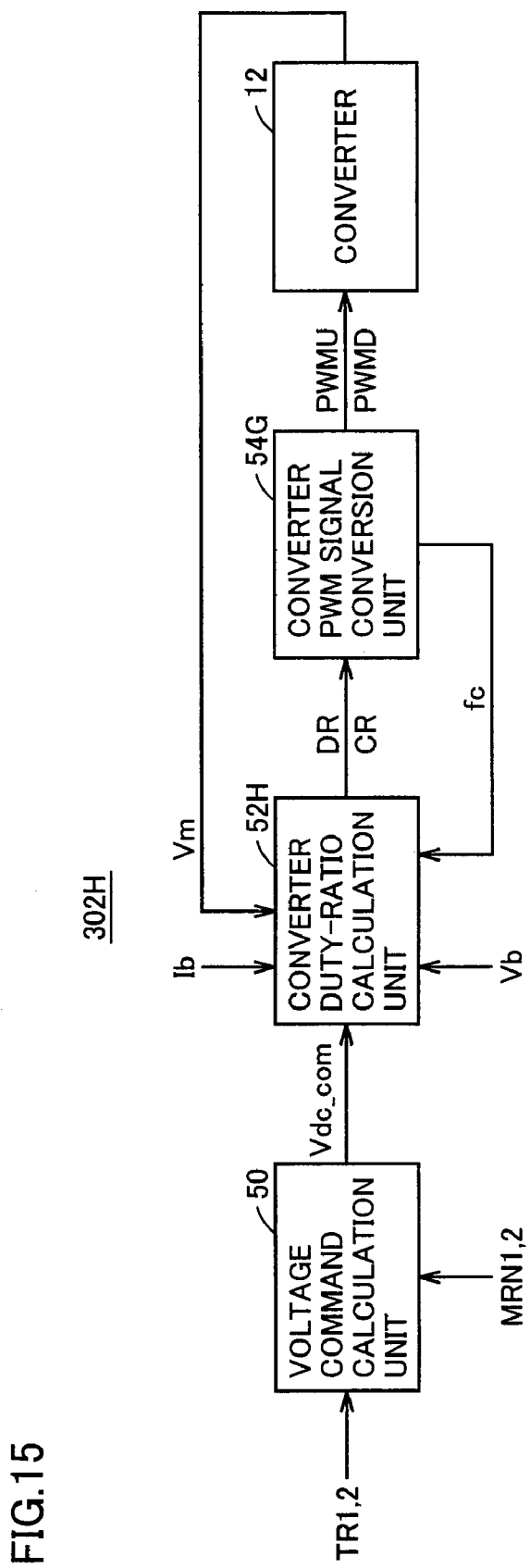
FIG. 15 is a functional block diagram of converter control means included in a control device in FIG. 14.

FIG. 15 is a functional block diagram of converter control means 302H included in control device 30 in FIG. 14. Referring to FIG. 15, converter control means 302H includes converter duty-ratio calculation unit 52H instead of converter duty-ratio calculation unit 52G of converter control means 302G in FIG. 9.

Converter duty-ratio calculation unit 52H receives voltage command value Vdc_com from voltage command calculation unit 50, DC voltage Vb from voltage sensor 10, internal resistance Rb from a battery ECU (not shown), output voltage Vm from voltage step-up converter 12, carrier frequency fc from converter PWM signal conversion unit 54, and DC current Ib from current sensor 32. Based on voltage command value Vdc_com and DC voltage Vb, converter duty-ratio calculation unit 52H calculates on-duties D_ON_1, D_ON_2 of NPN transistors Q1, Q2 of voltage step-up converter 12 using expression (1) described above.

Further, converter duty-ratio calculation unit 52H determines whether or not on-duty D_ON_1 calculated based on voltage command value Vdc_com is influenced by dead time Dt. In the present modification, converter duty-ratio calculation unit 52H determines whether or not on-duty D_ON_1 is influenced by dead time Dt based on whether or not a surge of DC current Ib may occur.

More specifically, converter duty-ratio calculation unit 52H determines the slope of the output waveform of DC current Ib provided from current sensor 32 ($\Delta Ib/\Delta t$), and determines whether or not the slope exceeds a predetermined threshold. In this case, if the slope of the output waveform of DC current Ib exceeds the predetermined threshold, converter duty-ratio calculation unit 52H determines that a sudden change (surge) may occur in DC current Ib. Then, based on the determination that the surge may occur in DC current Ib, converter duty-ratio calculation unit 52H determines that on-duty D_ON_1 is influenced by dead time Dt. In contrast, when the slope of the output waveform of DC current Ib is equal to or smaller than the predetermined threshold, converter duty-ratio calculation unit 52H determines that no surge occurs in DC current Ib. At this time, converter duty-ratio calculation unit 52H determines that on-duty D_ON_1 is not influenced by dead time Dt.

When converter duty-ratio calculation unit 52H determines that on-duty D_ON_1 is influenced by dead time Dt, calculation unit 52H sets on-duty D_ON_1 using maximum effective on-duty D_MAX and the longest on-duty. The specific method of this setting is the same as the method described for converter duty-ratio calculation unit 52G in FIG. 9. In other words, converter duty-ratio calculation unit 52H makes a switch between maximum effective on-duty D_MAX and the longest on-duty (=1) at predetermined ratio CR to match a finally obtained on-duty with on-duty D_ON_1 calculated based on voltage command value Vdc_com.

In contrast, when converter duty-ratio calculation unit 52H determines that on-duty D_ON_1 is not influenced by dead time Dt, calculation unit 52H uses on-duty D_ON_1 calculated from expression (1). Then, converter duty-ratio calculation unit 52H outputs, to converter PWM signal conversion unit 54G, duty ratio DR that is the ratio between on-duty D_ON_1 and on-duty D_ON_2.

Figure 16:
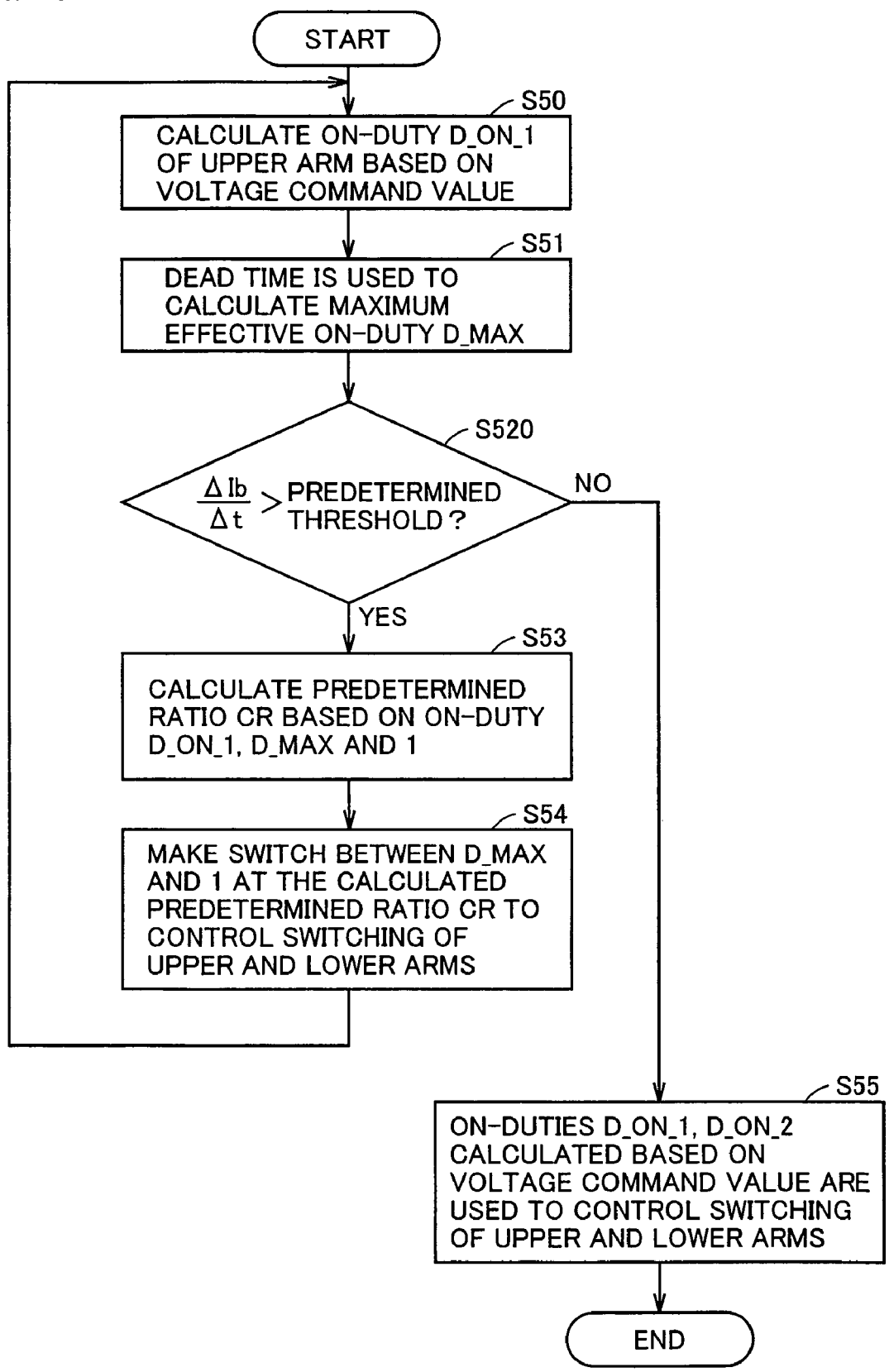
FIG. 16 is a flowchart illustrating an operation by the converter control means controlling voltage conversion by a voltage step-up converter.

FIG. 16 is a flowchart illustrating an operation of converter control means 302H of controlling voltage conversion by voltage step-up converter 12.

Referring to FIG. 16, on the start of a series of operations, converter duty-ratio calculation unit 52H calculates, based on voltage command value Vdc_com from voltage command calculation unit 50 and DC voltage Vb from voltage sensor 10, on-duty D_ON_1 of NPN transistor Q1 (upper arm) according to expression (1) (step S50).

Then, converter duty-ratio calculation unit 52H receives carrier frequency fc from converter PWM signal conversion unit 54G to calculate control period length T determined by the received carrier frequency fc. Converter duty-ratio calculation unit 52H substitutes control period length T and dead time Dt into expression (2) to calculate maximum effective on-duty D_MAX (step S51).

Converter duty-ratio calculation unit 52H thereafter determines whether or not the slope ($\Delta Ib/\Delta t$) of the output waveform of DC current Ib is larger than a predetermined threshold (step S520). Specifically, based on whether or not a surge of DC current Ib may occur, converter duty-ratio calculation unit 52H determines whether or not on-duty D_ON_1 is influenced by dead time Dt.

When the slope of the output waveform of DC current Ib is larger than the predetermined threshold, converter duty-ratio calculation unit 52H determines that on-duty D_ON_1 is influenced by dead time Dt and substitutes on-duty D_ON_1, maximum effective on-duty D_MAX and the longest on-duty (=1) into expression (6) to determine predetermined ratio CR (step S53). Then, converter duty-ratio calculation unit 52H outputs the calculated predetermined ratio CR to converter PWM signal conversion unit 54G.

Based on predetermined ratio CR from converter duty-ratio calculation unit 52H, converter PWM signal conversion unit 54G generates signal PWMU or signal PWMD and outputs the generated signal to NPN transistors Q1, Q2. Accordingly, switching of NPN transistors Q1, Q2 is controlled by making a switch between maximum effective on-duty D_MAX and the longest on-duty at predetermined ratio CR (step S54).

After this, until on-duty D_ON_1 reaches maximum effective on-duty D_MAX, the switch is made between the longest on-duty and maximum effective on-duty D_MAX at predetermined ratio CR and steps S50 to S54 are repeatedly carried out. When it is determined in step S520 that the slope of the output waveform of DC current Ib is equal to or smaller than the predetermined threshold, converter duty-ratio calculation unit 52H calculates duty ratio DR between on-duty D_ON_1 and on-duty D_ON_2 calculated based on voltage command value Vdc_com, and outputs the calculated duty ratio DR to converter PWM signal conversion unit 54G.

Based on duty ratio DR from converter duty-ratio calculation unit 52H, converter PWM signal conversion unit 54G generates signal PWMU or signal PWMD and outputs the generated signal to NPN transistors Q1, Q2. Accordingly, switching of NPN transistors Q1, Q2 is controlled using on-duties D_ON_1, D_ON_2 calculated based on voltage command value Vdc_com (step S55). The series of operations is then completed.

As discussed above, according to the second embodiment of the present invention, the on-duty can linearly be controlled without influence of the dead time. Therefore, a sudden change in DC current can be prevented and any damage to the DC power supply can be avoided.

It is noted that, control of voltage conversion by converter control means 302G, 302H is, like the one by converter control means 302A to 302C, actually performed by a CPU. The CPU reads from a ROM a program including the steps of each of the flowcharts shown in FIGS. 13 and 16, executes the read program and controls the voltage conversion following each of the flowcharts shown in FIGS. 13 and 16. Therefore, the ROM corresponds to a computer (CPU)-readable recording medium having the program recorded thereon that includes the steps of each of the flowcharts shown in FIGS. 13 and 16.

Moreover, the longest on-duty corresponds to "second duty" when the power supply voltage is the voltage command value. Maximum effective on-duty D_MAX corresponds to "first duty" when a voltage equal to or larger than a predetermined voltage is the voltage command value. In the present embodiment, although "first duty" is a duty when the predetermined voltage is the voltage command value, it is not limited to the one herein described. Alternatively "first duty" may be any duty when a voltage equal to or larger than a predetermined voltage is the voltage command value, from which influence of the dead time is removed.

Third Embodiment

In connection with the first and second embodiments, it is described above that an example of the influence of dead time Dt on on-duty D_ON_1 is that the on-duty cannot linearly be controlled when on-duty D_ON_1 of the upper arm is in a region close to 1.0. A description is then given of a method of avoiding the resultant oscillations of output voltage Vm and DC current Ib.

Figure 17:
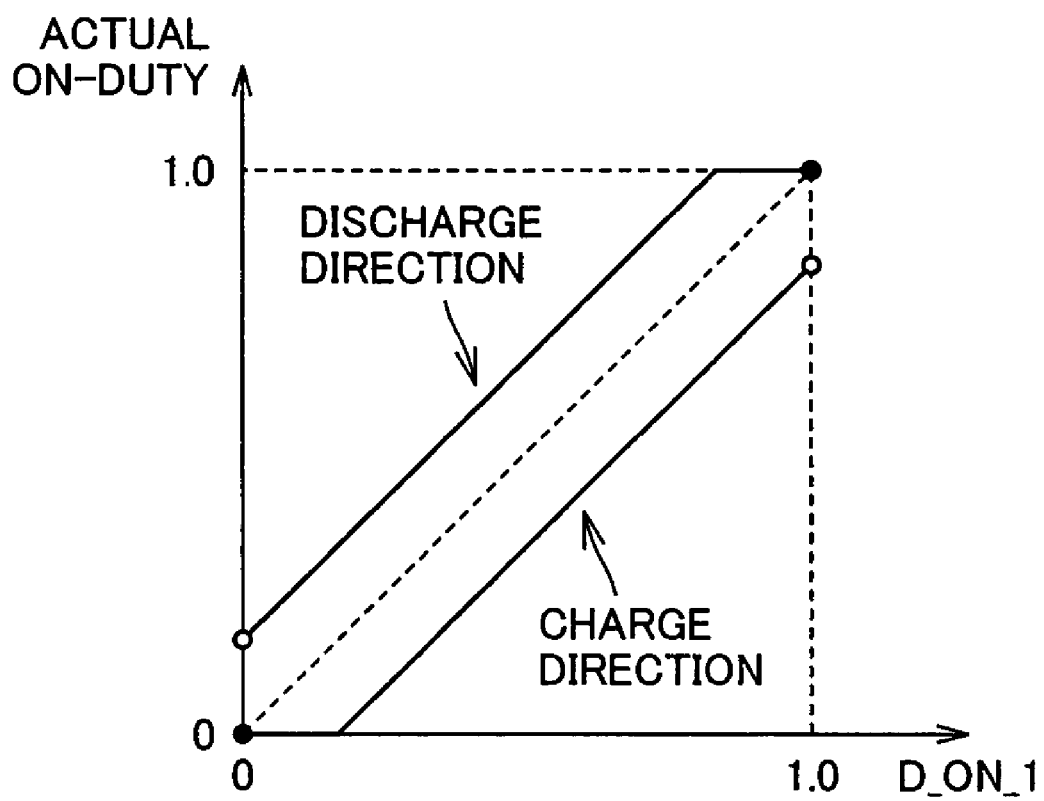
FIG. 17 shows a relation between on-duty D_ON_1 and an actual on-duty.

Another example of the influence of dead time Dt on on-duty D_ON_1 is, as shown in FIG. 17, occurrence of an error between a calculated on-duty D_ON_1 and the on-duty at which NPN transistor Q1 is actually kept ON.

FIG. 17 shows a relation between on-duty D_ON_1 and the actual on-duty.

In FIG. 17, "discharge direction" refers to the direction in which DC voltage Vb that is stepped up by voltage step-up converter 12 in FIG. 1 is supplied to capacitor 13. In the discharge direction, DC current Ib flows through DC power supply B, reactor L1 and NPN transistor Q1 to a positive bus of inverters 14, 31. While NPN transistors Q1, Q2 are kept OFF during the period of dead time Dt, reactor current IL flowing through reactor L1 flows through diode D1 to the positive bus. Therefore, in the period of dead time Dt, NPN transistor Q1 is substantially ON.

Consequently, the actual on-duty of NPN transistor Q1 is longer than the calculated on-duty D_ON_1 as shown in FIG. 17.

Further, in FIG. 17, "charge direction" refers to the direction in which a DC voltage that is supplied from inverter 14 (or 31) through capacitor 13 to voltage step-up converter 12 and stepped down by converter 12 is supplied to DC power supply B. In the charge direction, DC current Ib flows through the negative electrode of DC power supply B, a negative bus, NPN transistor Q2, reactor L1, the positive bus, and the positive electrode of DC power supply B. Then, as described above, while NPN transistors Q1, Q2 are kept OFF during the period of dead time Dt, DC current Ib flows through diode D2 to reactor L1. Therefore, in the period of dead time Dt, NPN transistor Q2 is substantially ON.

Consequently, the actual on-duty of NPN transistor Q1 is shorter than calculated on-duty D_ON_1 as shown in FIG. 17.

When on-duty D_ON_1 is 1, namely when the voltage step-up operation is stopped, control of switching of NPN transistors Q1, Q2 is not performed. Therefore, the actual on-duty is not influenced by dead time Dt and is equal to calculated on-duty D_ON_1.

However, when on-duty D_ON_1 is in a region fairly close to 1 and the operation makes a transition to the state where the voltage step-up operation is stopped or the voltage step-up operation is started, the actual on-duty suddenly changes, as shown in FIG. 17, due to the influence of dead time Dt, resulting in a sudden change in output voltage Vm and DC current Ib. Thus, there arises the possibility of damage to DC power supply B and voltage step-up converter 12 and shortening of the lifetime.

Then, the present embodiment discloses a voltage conversion device that can reduce, when the voltage step-up operation is started and stopped, the change in output voltage Vm and DC current Ib by reducing influence of dead time Dt. It is noted that a motor drive apparatus having the voltage conversion device in the present embodiment is the same in basic circuit configuration as motor drive apparatus 100 in FIG. 1 and different therefrom in that the former includes converter control means 302D instead of converter control means 302A of control device 30. Therefore, the detailed description of common circuit components is not repeated.

Figure 18:
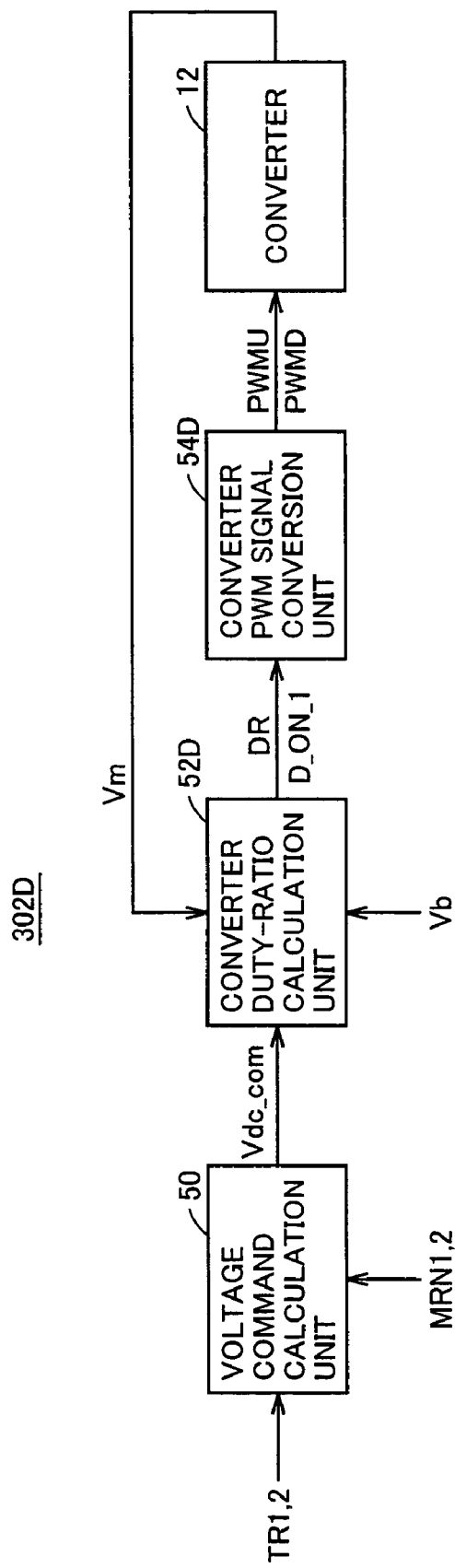
FIG. 18 is a functional block diagram of converter control means of a motor drive apparatus according to a third embodiment of the present invention.

FIG. 18 is a functional block diagram of converter control means 302D of the motor drive apparatus of the third embodiment of the present invention.

Referring to FIG. 18, converter control means 302D includes a voltage command calculation unit 50, a converter duty-ratio calculation unit 52D and a converter PWM signal conversion unit 54D.

Voltage command calculation unit 50 calculates, based on torque command value TR1 (or TR2) and motor revolution number MRN1 (or MRN2) from an external ECU, an optimum value (target value) of the inverter input voltage, namely calculates voltage command value Vdc_com of voltage step-up converter 12, and outputs the calculated voltage command value Vdc_com to converter duty-ratio calculation unit 52D.

Converter duty-ratio calculation unit 52D calculates, based on voltage command value Vdc_com from voltage command calculation unit 50 and DC voltage Vb from voltage sensor 10, on-duty D_ON_1 of NPN transistor Q1 of voltage step-up converter 12 according to expression (1).

Then, converter duty-ratio calculation unit 52D uses the calculated on-duty D_ON_1 to calculate on-duty D_ON_2=1−D_ON_1 of NPN transistor Q2. Converter duty-ratio calculation unit 52D outputs the calculated on-duty D_ON_1 to converter PWM signal conversion unit 54D. Further, converter duty-ratio calculation unit 52D outputs duty ratio DR that is the ratio between on-duty D_ON_1 and on-duty D_ON_2 to converter PWM signal conversion unit 54D.

Converter duty-ratio calculation unit 52D calculates the deviation between voltage command value Vdc_com and voltage Vm from voltage sensor 20 (Vdc_com−Vm), and then calculates duty-ratio DR so that the calculated deviation (Vdc_com−Vm) is equal to zero.

Converter PWM signal conversion unit 54D generates, based on duty-ratio DR and on-duty D_ON_1 from converter duty-ratio calculation unit 52D, signal PWMU or signal PWMD for turning on/off NPN transistors Q1, Q2 of voltage step-up converter 12.

Figure 19:
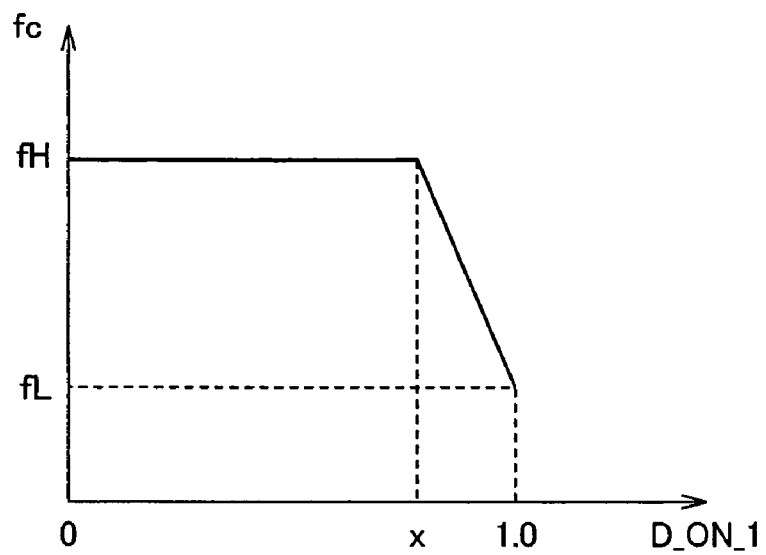
FIG. 19 shows a relation between on-duty D_ON_1 and carrier frequency fc.

In relation to the generation of signal PWMU or signal PWMD, converter PWM signal conversion unit 54D stores in advance a relation between on-duty D_ON_1 and carrier frequency fc shown in FIG. 19 so that carrier frequency fc is variable based on this map.

FIG. 19 shows the relation between on-duty D_ON_1 and carrier frequency fc.

Referring to FIG. 19, carrier frequency fc changes, in a region where on-duty D_ON_1 is close to 1.0 ($x \leq D\_ON\_1 < 1$, where $0 < x < 1$), to carrier frequency fL that is relatively low with respect to carrier frequency fH. Accordingly, control period length T that is determined by carrier frequency fc is relatively long when on-duty D_ON_1 is close to 1.0. Then, when on-duty D_ON_1 is in the region where it is close to 1.0, the ratio of dead time Dt to control period length T is relatively low and the influence of dead time Dt is reduced.

Regarding carrier frequency fL, a lower frequency would be effective in reducing the influence of dead time Dt. However, if the frequency is lowered to any in the audio-frequency range, unpleasant noise occurs to voltage step-up converter 12. Therefore, the frequency is set to an arbitrary frequency with its lowest level in the audio-frequency range.

Converter PWM signal conversion unit 54D uses carrier frequency fc that is set based on on-duty D_ON_1 to generate signal PWMU or signal PWMD and outputs the generated signal PWMU or signal PWMD to NPN transistors Q1, Q2 of voltage step-up converter 12.

Figure 20:
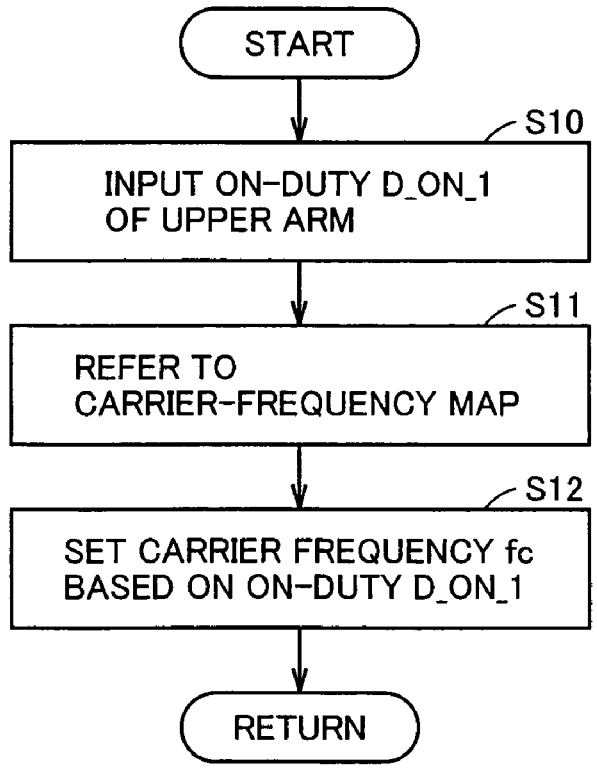
FIG. 20 is a flowchart illustrating an operation of controlling carrier frequency fc by a converter PWM signal conversion unit 54D of the converter control means in FIG. 18.

FIG. 20 is a flowchart illustrating an operation of controlling carrier frequency fc by converter PWM signal conversion unit 54D of converter control means 302D.

Referring to FIG. 20, in converter control means 302D, on the start of a series of operations for voltage conversion, converter PWM signal conversion unit 54D receives, from converter duty-ratio calculation unit 52D, on-duty D_ON_1 that is calculated based on voltage command value Vdc_com and DC voltage Vb as well as duty ratio DR determined from the calculated on-duties D_ON_1, D_ON_2 (step S10).

Converter PWM signal conversion unit 54D refers to the map showing the relation between on-duty D_ON_1 and carrier frequency fc in FIG. 19 (step S11), and sets carrier frequency fc based on the received on-duty D_ON_1 (step S12).

When voltage step-up converter 12 performs a voltage step-up operation, at each of respective times when a transition is made to the state where the voltage step-up operation is stopped, and when a voltage step-up operation is started, converter PWM signal conversion unit 54D sets carrier frequency fc following the flowchart in FIG. 20.

Figure 21:
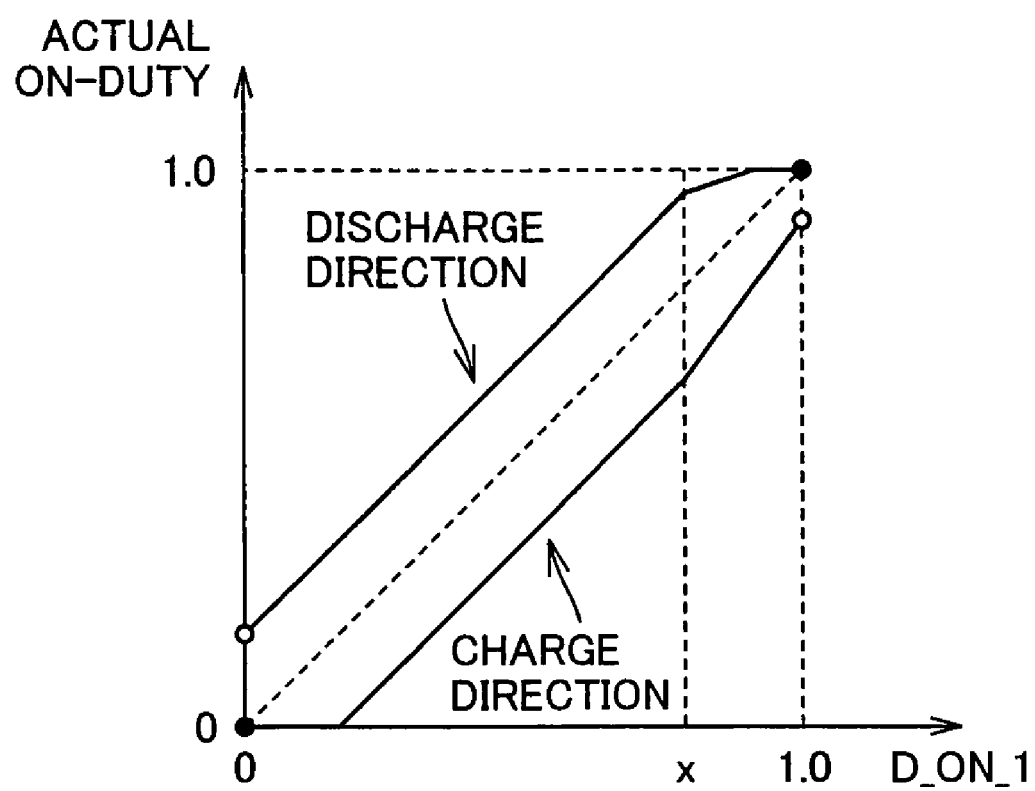
FIG. 21 shows a relation between on-duty D_ON_1 based on voltage conversion and an actual on-duty, according to the third embodiment of the present invention.

FIG. 21 shows a relation between on-duty D_ON_1 based on voltage conversion in the third embodiment of the present invention and the actual on-duty.

As clearly seen from FIG. 21, when on-duty D_ON_1 is in a region where it is close to 1.0, with respect to both of the charge direction and discharge direction, the difference between on-duty D_ON_1 and the actual on-duty is reduced. Thus, the influence of dead time Dt when the voltage step-up operation is started or stopped is reduced. Accordingly, any sudden change in output voltage Vm and DC current Ib is reduced and damage to DC power supply B and voltage step-up converter 12 can be avoided.

First Modification

Figure 22:
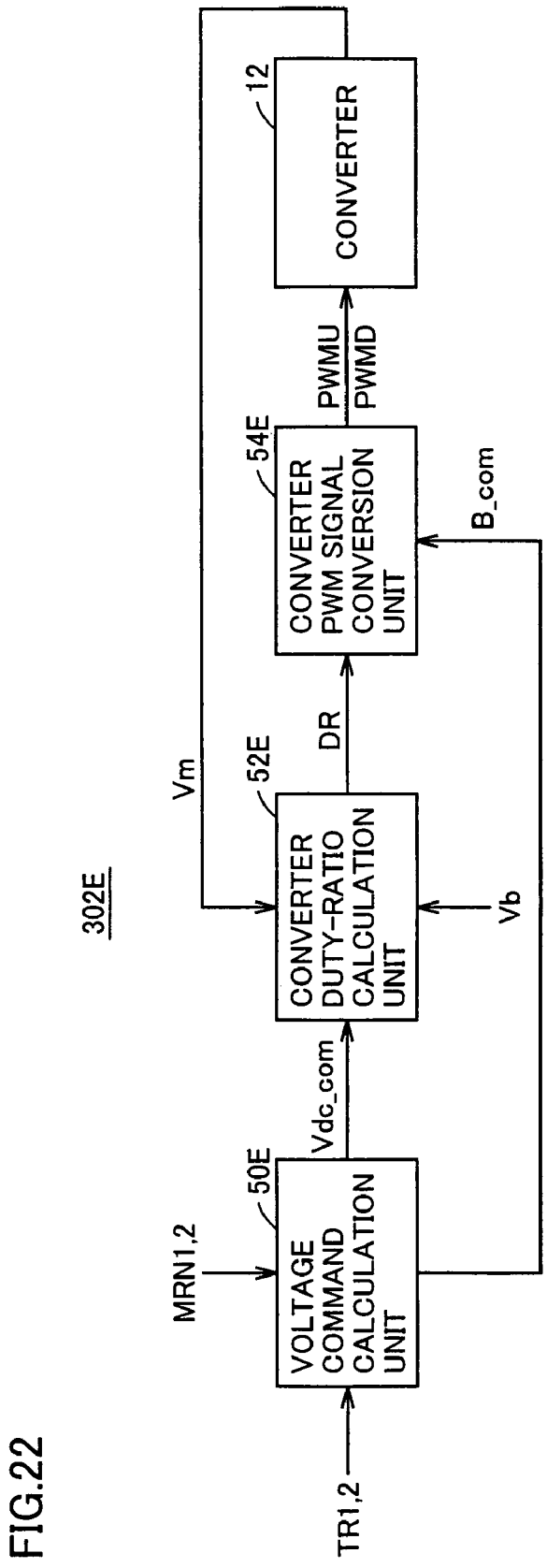
FIG. 22 is a functional block diagram of converter control means of the motor drive apparatus according to a first modification of the third embodiment of the present invention.

FIG. 22 is a functional block diagram of converter control means 302E of the motor drive apparatus according to a first modification of the third embodiment of the present invention.

Referring to FIG. 22, converter control means 302E includes a voltage command calculation unit 50E, a converter duty-ratio calculation unit 52E and a converter PWM signal conversion unit 54E.

Voltage command calculation unit 50E calculates, based on torque command value TR1 (or TR2) and motor revolution number MRN1 (or MRN2) from an external ECU, an optimum value (target value) of the inverter input voltage, namely calculates voltage command value Vdc_com of voltage step-up converter 12 and outputs the calculated voltage command value Vdc_com to converter duty-ratio calculation unit 52E.

Then, based on the magnitude of voltage command value Vdc_com, voltage command calculation unit 50E generates step-up state command signal B_com, and outputs the generated step-up state command signal B_com to converter PWM signal conversion unit 54E. More specifically, voltage command calculation unit 50E generates, when voltage command value Vdc_com is higher than DC voltage Vb, voltage step-up state command signal B_com for instructing to start a voltage step-up operation, and outputs the generated signal to converter PWM signal conversion unit 54E. When voltage command value Vdc_com becomes equal to DC voltage Vb, voltage command calculation unit 50E generates voltage step-up state command signal B_com for instructing to stop the voltage step-up operation, and outputs the generated signal to converter PWM signal conversion unit 54E.

Based on voltage command value Vdc_com from voltage command calculation unit 50E and DC voltage Vb from voltage sensor 10, converter duty-ratio calculation unit 52E calculates on-duty D_ON_1 of NPN transistor Q1 of voltage step-up converter 12 according to expression (1).

Converter duty-ratio calculation unit 52E uses the calculated on-duty D_ON_1 to calculate on-duty D_ON_2=1−D_ON_1 of NPN transistor Q2, and outputs duty ratio DR that is the ratio between the calculated on-duties D_ON_1 and D_ON_2 to converter PWM signal conversion unit 54E.

Converter duty-ratio calculation unit 54E calculates the deviation between voltage command value Vdc_com and voltage Vm from voltage sensor 20 (Vdc_com−Vm) and calculates duty ratio DR so that the calculated deviation (Vdc_com−Vm) is equal to zero.

Based on duty ratio DR from converter duty-ratio calculation unit 52E, converter PWM signal conversion unit 54E generates signal PWMU or signal PWMD for turning on/off NPN transistors Q1, Q2 of voltage step-up converter 12.

In relation to the generation of signal PWMU or PWMD, converter PWM signal conversion unit 54E allows carrier frequency fc to be variable based on voltage step-up state command signal B_com from voltage command calculation unit 50E.

More specifically, receiving voltage step-up state command signal B_com instructing to start a voltage step-up operation, converter PWM signal conversion unit 54E sets carrier frequency fc to carrier frequency fL that is relatively low, in a predetermined period from the timing at which the command is received. Further, receiving voltage step-up state command signal B_com instructing to stop the voltage step-up operation, converter PWM signal conversion unit 54E sets carrier frequency fc to relatively low carrier frequency fc in a predetermined signal from the timing at which the command is received.

Figure 23:
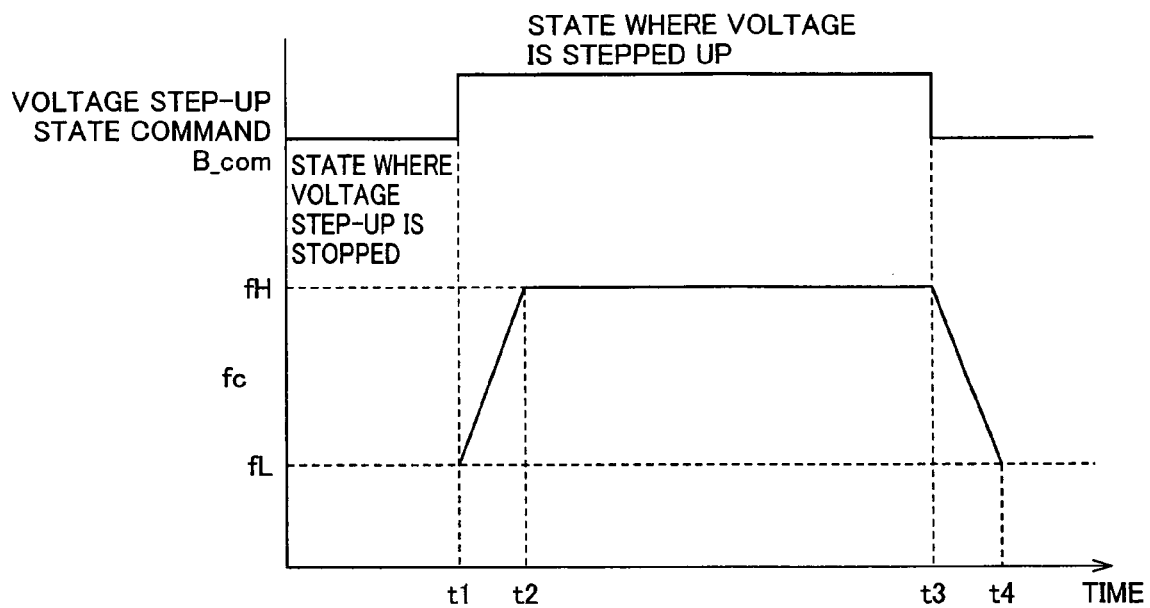
FIG. 23 is a timing chart showing a relation between step-up state command signal B_com and carrier frequency fc.

FIG. 23 is a flowchart showing a relation between voltage step-up state command signal B_com and carrier frequency fc.

Referring to FIG. 23, when an instruction to start a voltage step-up operation is input at timing t1, converter PWM signal conversion unit 54E sets carrier frequency fc, which is at carrier frequency fH that is the frequency in a normal voltage step-up operation, to relatively low carrier frequency fL. Then, converter PWM signal conversion unit 54E gradually increases carrier frequency to carrier frequency fH in a predetermined period from timing t1 to timing t2. Further, in a voltage step-up state after timing t2, converter PWM signal conversion unit 54E fixes carrier frequency fc at carrier frequency fH.

Subsequently, when an instruction to stop the voltage step-up operation is input at timing t3, converter PWM signal conversion unit 54E gradually decreases carrier frequency fc to carrier frequency fL in a predetermined period from timing t3 to timing t4.

Relatively low frequency fL here is the same as carrier frequency fL in FIG. 11. According to the present modification, the period in which carrier frequency fc is set to a relatively low frequency is limited to a short period to shorten a period in which noise is generated due to the decrease in carrier frequency FIG. 24 is a flowchart illustrating an operation of controlling carrier frequency fc by converter PWM signal conversion unit 54E of converter control means 302E.

Figure 24:
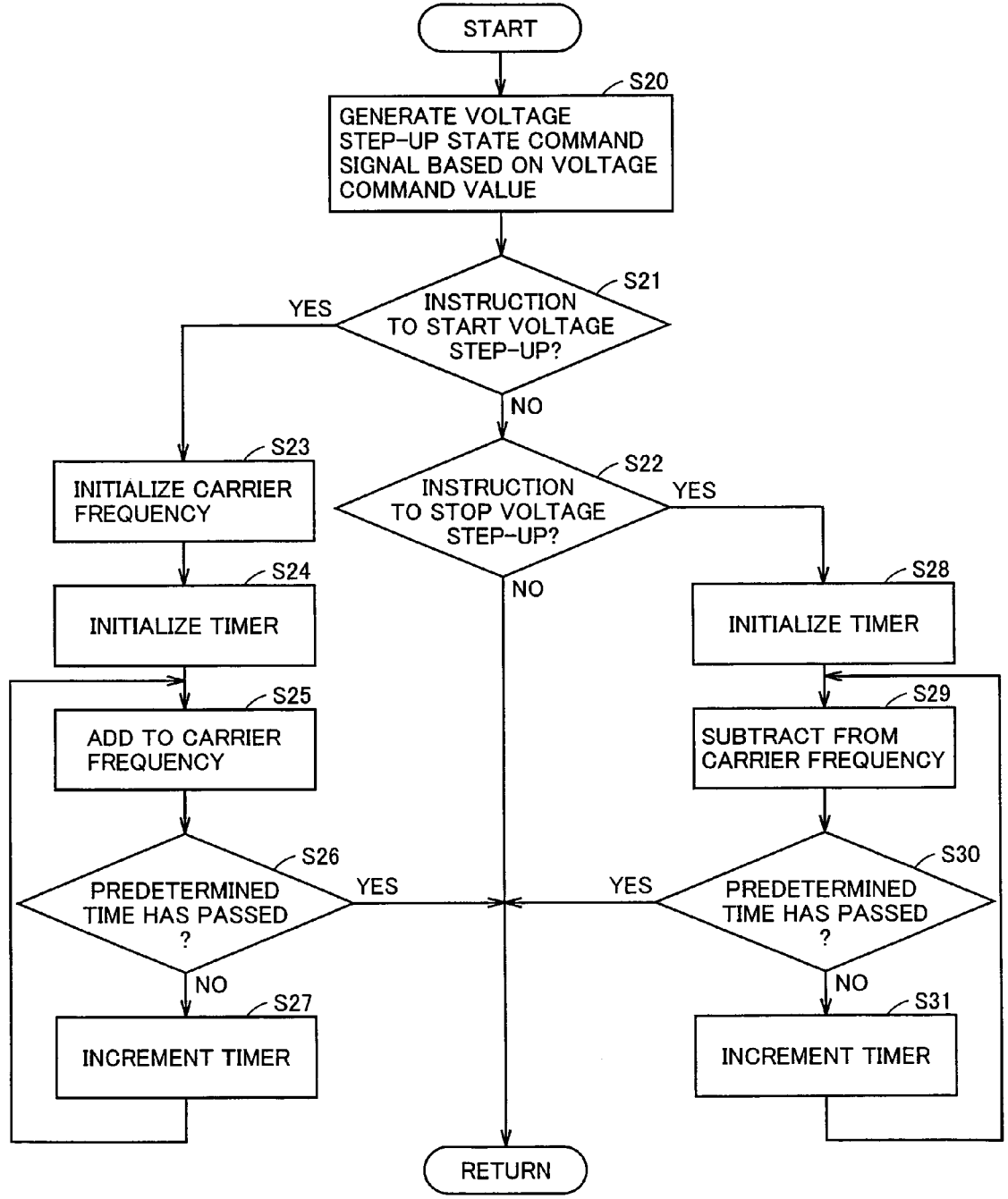
FIG. 24 is a flowchart illustrating an operation of controlling carrier frequency fc by a converter PWM signal conversion unit of the converter control means in FIG. 22.

Referring to FIG. 24, in converter control means 302E, on the start of a series of operations for controlling voltage conversion, converter PWM signal conversion unit 54E receives voltage step-up state command signal B_com that is generated based on voltage command value Vdc_com (step S20).

Then, converter PWM signal conversion unit 54E determines whether or not the received voltage step-up state command signal B_com indicates an instruction to start a voltage step-up operation (step S21).

When converter PWM signal conversion unit 54E determines that an instruction to start the voltage step-up operation is given, conversion unit 54E initializes carrier frequency fc and sets the frequency to relatively low carrier frequency fL (step S23). Converter PWM signal conversion unit 54E initializes a timer (not shown) contained therein to start counting of a predetermined period starting from input timing tl of voltage step-up state command signal B_com (step S24) and add a predetermined amount of change in frequency .DELTA.fc to carrier frequency fL each time the count is incremented by one (step S25).

Until the predetermined period passes (corresponding to YES in step S26), converter PWM signal conversion unit 54E increments the count value of the timer (step S27) while gradually increasing carrier frequency fc.

Finally, at timing t2 at which the predetermined period has passed, converter PWM signal conversion unit 54E fixes carrier frequency fc at carrier frequency fH that is used in a normal voltage step-up operation.

In contrast, when converter PWM signal conversion unit 54E determines that the instruction to start a voltage step-up operation is not given, conversion unit 54E subsequently determines whether or not an instruction to stop the voltage step-up operation is given (step S22).

When converter PWM signal conversion unit 54E determines that the instruction to stop the voltage step-up operation is given, conversion unit 54E initializes the timer (step S28) and starts counting of a predetermined period starting from input timing t3 of voltage step-up state command signal B_com. Then, converter PWM signal conversion unit 54E subtracts the predetermined amount of change in frequency Δfc from carrier frequency fH each time the count is incremented by one (step S29).

Then, until the predetermined period passes (corresponding to YES in step S30), converter PWM signal conversion unit 54E increments the count value of the timer (step S31) while gradually decreasing carrier frequency fc. Accordingly, at timing t4 at which the predetermined period has passed, carrier frequency fc is relatively low frequency fL.

Second Modification

Referring again to the relation shown in FIG. 17 between on-duty D_ON__1 and the actual on-duty, with respect to both of the charge direction and the discharge direction, there arises a difference, corresponding to the period of dead time Dt, between on-duty D_ON__1 determined based on voltage command value Vdc_com and the actual on-duty.

Here, regarding the difference concerning the charge direction in the region where on-duty D_ON__1 is close to 1.0, at the timing of transition from the state where a voltage step-up operation is carried out (both of D_ON__1 and actual on-duty are smaller than 1) to the state where the voltage step-up operation is stopped (both of D_ON__1 and actual on-duty are 1), the actual on-duty suddenly changes for example from 0.95 to 1.0 due to influence of the aforementioned difference. Accordingly, output voltage Vm and DC current Ib suddenly change to damage DC power supply B and voltage step-up converter 12.

Concerning the discharge direction, at the timing of transition from the state where the voltage step-up operation is stopped (both of D_ON__1 and actual on-duty are 1) to the state of starting the voltage step-up operation, the actual on-duty is kept at 1.0 for a predetermined period due to the difference. When on-duty D_ON__1 becomes for example 0.95 or smaller, the actual on-duty starts to change in proportion to on-duty D_ON__1. Thus, immediately after the voltage step-up operation is started, output voltage Vm and DC current Ib do not suddenly change. In other words, there is small influence of dead time Dt.

Therefore, in the present modification, concerning only the charge direction for which output voltage Vm and DC current Ib suddenly change, carrier frequency fc is lowered when on-duty D_ON__1 is close to 1.0.

Thus, the influence of dead time Dt can be reduced and the frequency of occurrence of noise caused by decreasing carrier frequency fc can be lowered.

Figure 25:
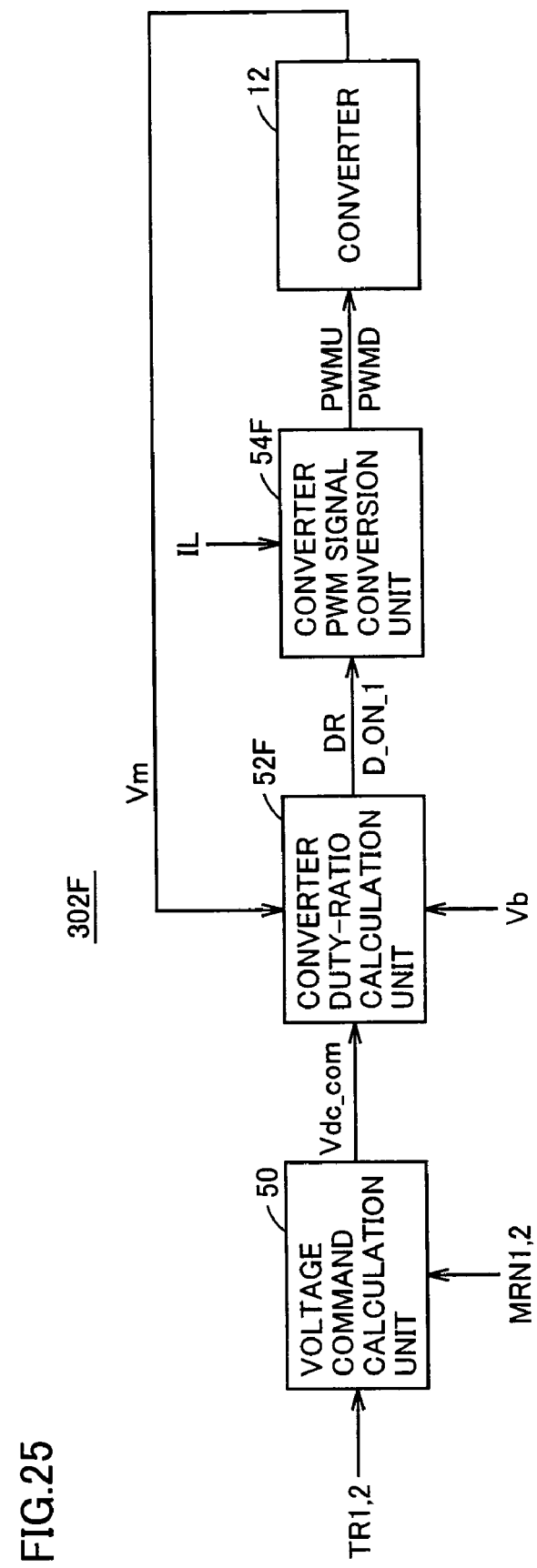
FIG. 25 is a functional block diagram of converter control means of the motor drive apparatus according to a second modification of the third embodiment of the present invention.

FIG. 25 is a functional block diagram of converter control means 302F of the motor drive apparatus according to the second modification of the third embodiment of the present invention.

Referring to FIG. 25, converter control means 302F includes a voltage command calculation unit 50, a converter duty-ratio calculation unit 52F and a converter PWM signal conversion unit 54F.

Voltage command calculation unit 50 calculates, based on torque command value TR1 (or TR2) and motor revolution number MRN1 (or MRN2) from an external ECU, voltage command value Vdc_com of voltage step-up converter 12 and outputs the calculated voltage command value Vdc_com to converter duty-ratio calculation unit 52F.

Converter duty-ratio calculation unit 52F calculates, based on voltage command value Vdc_com from voltage command calculation unit 50 and DC voltage Vb from voltage sensor 10, on-duty D_ON__1 of NPN transistor Q1 of voltage step-up converter 12 according to expression (1), and outputs the calculated on-duty D_ON__1 to converter PWM signal conversion unit 54F. Then, converter duty-ratio calculation unit 52F uses the calculated on-duty D_ON_1 to calculate on-duty D_ON_2=1−D_ON_1 of NPN transistor Q2, and outputs duty ratio DR between the calculated on-duties D_ON_1 and D_ON_2 to converter PWM signal conversion unit 54F.

Converter duty-ratio calculation unit 52F calculates the deviation between voltage command value Vdc_com and output voltage Vm from voltage sensor 20 (Vdc_com−Vm), and calculates duty ratio DR so that the calculated deviation (Vdc_com−Vm) is equal to zero.

Converter PWM signal conversion unit 54F receives on-duty D_ON_1 and duty ratio DR from converter duty-ratio calculation unit 52F as well as reactor current IL. Converter PWM signal conversion unit 54F receives, as reactor current IL, the value detected by a current sensor (not shown) that is newly provided to reactor L1 of FIG. 1 or the value of DC current Ib detected by current sensor 10.

Converter PWM signal conversion unit 54F then determines whether reactor current IL flows in the charge direction or the discharge direction, namely whether control is performed for decreasing output voltage Vm or increasing output voltage Vm. More specifically, based on the condition that reactor current IL in the discharge direction is positive and reactor current IL in the charge direction is negative, converter PWM signal conversion unit 54F determines whether reactor current IL it receives is positive or negative to determine whether the reactor current flows in the discharge direction or the charge direction.

Then, when converter PWM signal conversion unit 54F determines that reactor current IL flows in the charge direction and control is performed to decrease output voltage Vm, conversion unit 54F accordingly determines that there is a large influence of dead time Dt to vary carrier frequency fc based on on-duty D_ON_1. Specifically, converter PWM signal conversion unit 54F stores, in advance, the relation between on-duty D_ON_1 and carrier frequency fc in the form of a map and varies carrier frequency fc based on this map.

Converter PWM signal conversion unit 54F uses carrier frequency fc that is set based on on-duty D_ON_1 as well as duty ratio DR to generate signal PWMU or signal PWMD and outputs the generated signal PWMU or signal PWMD to NPN transistors Q1, Q2 of voltage step-up converter 12.

In contrast, when converter PWM signal conversion unit 54F determines that reactor current IL flows in the discharge direction and control is performed for increasing output voltage Vm, conversion unit 54F accordingly determines that there is a small influence of dead time Dt to fix carrier frequency fc at carrier frequency fH for the normal voltage step-up operation regardless of on-duty D_ON_1. Then, converter PWM signal conversion unit 54F uses carrier frequency fH and duty ratio DR to generate signal PWMU or signal PWMD for turning on/off NPN transistors Q1, Q2 of voltage step-up converter 12 and outputs the generated signal PWMU or PWMD to NPN transistors Q1, Q2 of voltage step-up converter 12.

Figure 26:
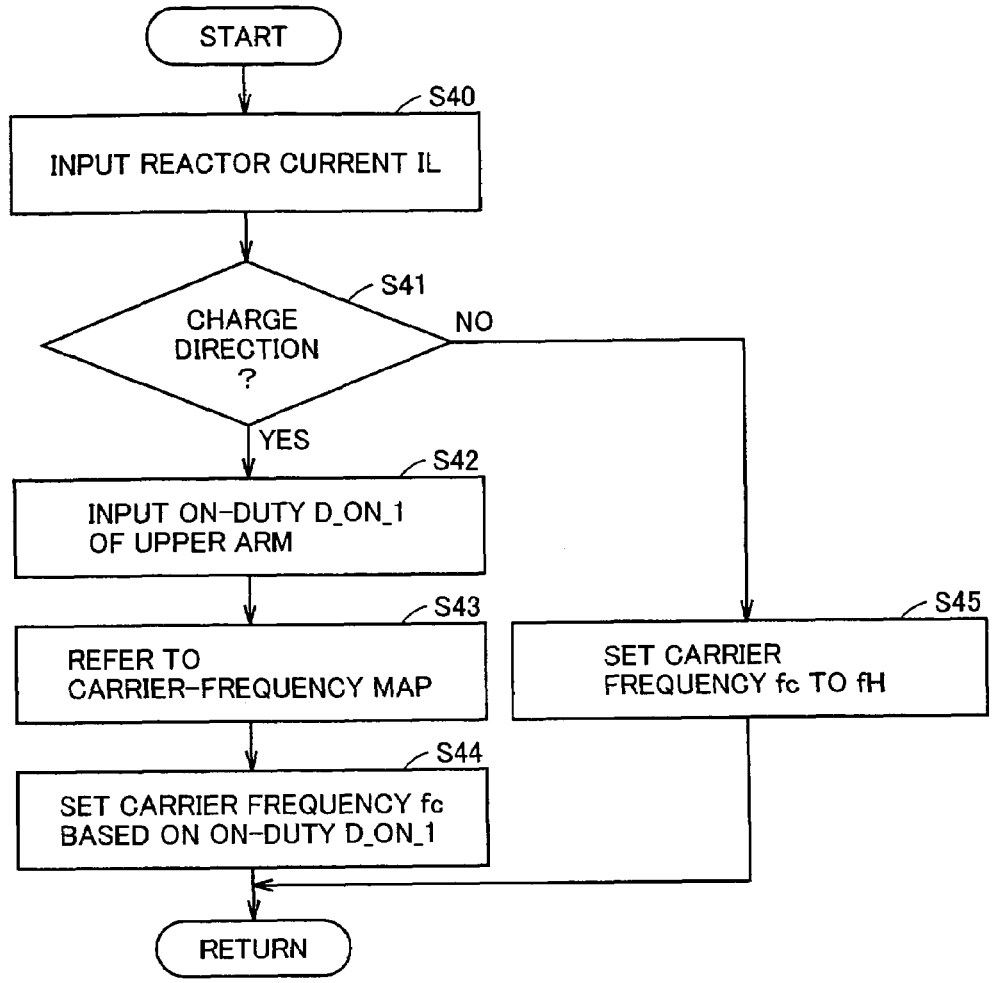
FIG. 26 is a flowchart illustrating an operation of controlling carrier frequency fc by a converter PWM signal conversion unit 54F of the converter control means in FIG. 25.

FIG. 26 is a flowchart illustrating an operation of controlling carrier frequency fc by converter PWM signal conversion unit 54F of converter control means 302F.

Referring to FIG. 26, in converter control means 302F, on the start of a series of operations for controlling voltage conversion, converter PWM signal conversion unit 54F receives from converter duty-ratio calculation unit 52F duty ratio DR determined by on-duties D_ON_1, D_ON_2 calculated based on voltage command value Vdc_com and DC voltage Vb. Further, converter PWM signal conversion unit 54F receives reactor current IL from a current sensor (not shown) provided to reactor L1 (step S40).

Converter PWM signal conversion unit 54F determines whether or not reactor current IL flows in the charge direction, namely whether or not control is performed for decreasing output voltage Vm (step S41).

When converter PWM signal conversion unit 54F determines that reactor current IL flows in the charge direction, conversion unit 54F receives calculated on-duty D_ON_1 from converter duty-ratio calculation unit 52F (step S42).

Converter PWM signal conversion unit 54F refers to the map in FIG. 19 showing the relation between on-duty D_ON_1 and carrier frequency fc (step S43) and sets carrier frequency fc based on on-duty D_ON_1 it receives (step S44).

In contrast, when converter PWM signal conversion unit 54F determines that reactor current IL flows in the discharge direction, conversion unit 54F sets carrier frequency fc to carrier frequency fH for the normal voltage step-up operation (step S45).

Figure 27:
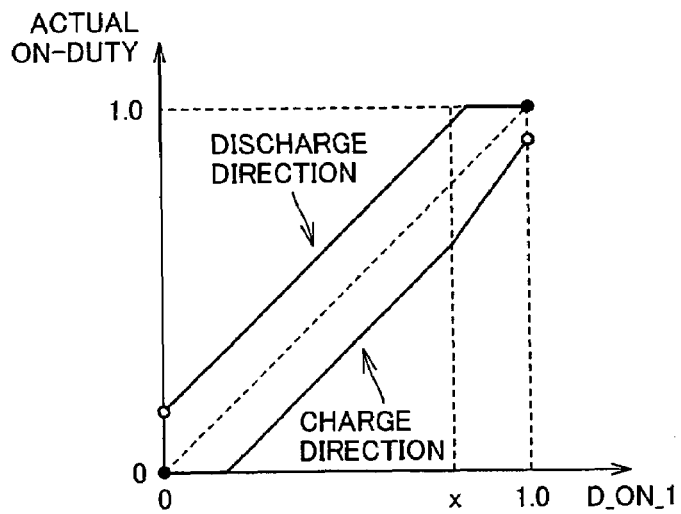
FIG. 27 shows a relation between on-duty D_ON_1 based on voltage conversion and an actual on-duty, according to a second modification of the third embodiment of the present invention.
Figure 28:
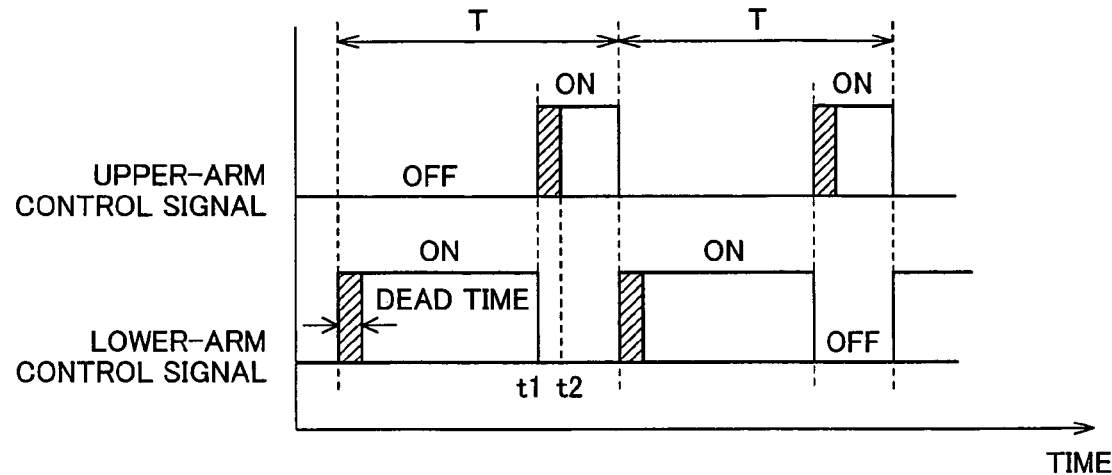
FIG. 28 is a timing chart of control signals controlling an upper arm and a lower arm.
Figure 29A:
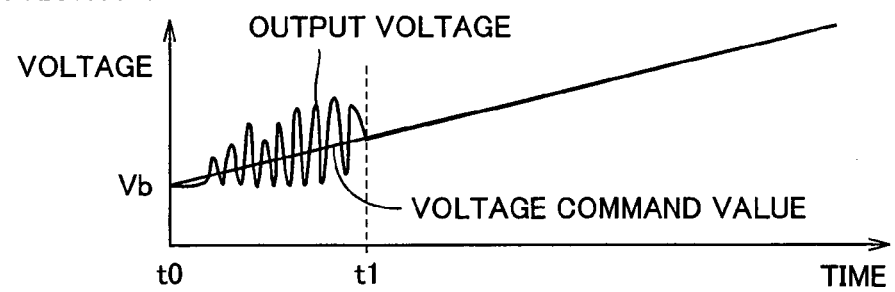
FIGS. 29A and 29B are timing charts respectively of the voltage and on-duty of the upper arm.
Figure 29B:
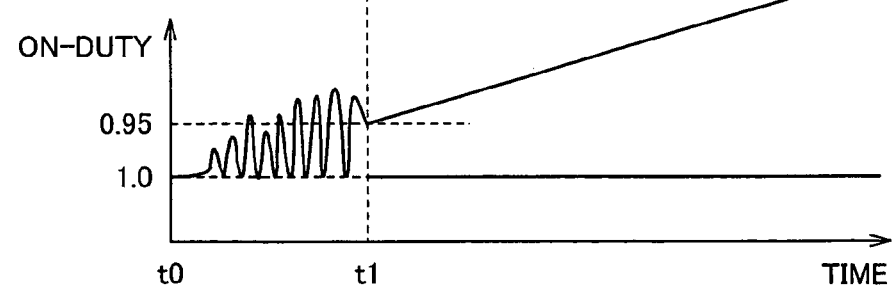

FIG. 27 shows a relation between on-duty D_ON_1 based on voltage conversion and an actual on-duty, according to the second modification of the third embodiment of the present invention.

As clearly seen from FIG. 27, in a region where on-duty D_ON_1 is close to 1.0, the difference between on-duty D_ON_1 and the actual on-duty is reduced for only the charge direction. Thus, a sudden change in output voltage Vm and DC current Ib concerning the charge direction which is influenced by dead time Dt to a large degree can effectively be prevented and the frequency of occurrence of noise can be lowered.

It is noted that, control of voltage conversion by converter control means 302D to 302F of control device 30 is, like the one by converter control means 302A to 302C of the first embodiment, actually performed by a CPU. The CPU reads from a ROM a program including the steps of each of the flowcharts shown in FIGS. 20, 24 and 26, executes the read program and controls the voltage conversion following each of the flowcharts shown in FIGS. 20, 24 and 26. Therefore, the ROM corresponds to a computer (CPU)-readable recording medium having the program recorded thereon that includes the steps of each of the flowcharts shown in FIGS. 20, 24 and 26.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voltage conversion device variably changing an input voltage to an inverter, the voltage conversion device comprising:
a voltage converter including an upper arm and a lower arm and performing voltage conversion between a power supply and said inverter by switching of said upper arm and said lower arm; and
a control device controlling said voltage converter so as to reduce influence of a dead time of said voltage converter on a duty of said switching, said duty being a period for which the upper arm or the lower arm is kept ON in one control period length,
wherein when a voltage command value of said voltage conversion, corresponding to a calculated target value of an input voltage for the inverter, is larger than a power supply voltage and smaller than a predetermined voltage and said power supply voltage is smaller than a predetermined set value, said control device controls said voltage converter by setting said duty to a duty for instructing to stop said voltage conversion, when said voltage command value is larger than said power supply voltage and smaller than said predetermined voltage and said power supply voltage is at least said predetermined set value, said control device controls said voltage converter by setting said duty to a duty for instructing to perform said voltage conversion, and said predetermined set value is set based on an allowable maximum voltage of said power supply, a maximum value of DC current of said power supply when said voltage converter makes a transition to a state where said voltage conversion is stopped, and an internal resistance of said power supply.

2. The voltage conversion device according to claim 1, wherein said internal resistance is set to a maximum value of the internal resistance that can be taken by said power supply.

3. The voltage conversion device according to claim 1, wherein said internal resistance is set to a measured value of said internal resistance.

4. The voltage conversion device according to claim 1, wherein said internal resistance is set based on the temperature of said power supply.

5. The voltage conversion device according to claim 1, wherein said maximum value of the DC current is set based on a detected value of an output voltage of said voltage converter and a detected value of said power supply voltage.

6. A voltage conversion device variably changing an input voltage to an inverter, the voltage conversion device comprising:

a voltage converter including an upper arm that is made ON at a first on-duty and a lower arm that is made ON at a second on-duty determined by subtracting said first on-duty from 1, and performing voltage conversion between a power supply and said inverter by switching of said upper arm and said lower arm; and a control device controlling switching of said upper arm and said lower arm by setting said first on-duty to an appropriate on-duty, when said first on-duty calculated based on a voltage command value of the voltage conversion by said voltage converter is influenced by a dead time of said upper arm and said lower arm and a power supply voltage is influenced by said dead time, wherein when said first on-duty calculated based on said voltage command value is larger than a maximum effective on-duty and smaller than a longest on-duty for keeping said upper arm ON for a control period length and said power supply voltage is at least a predetermined set value, said control device controls switching of said upper arm and said lower arm by setting said first on-duty to said maximum effective on-duty, said maximum effective on-duty is determined by dividing, by said control period length, an effective control period length determined by subtracting said dead time from said control period length, and said predetermined set value is determined by subtracting, from an allowable maximum voltage of said power supply, a product of an internal resistance of said power supply and a maximum value of DC current of said power supply when said first on-duty is switched to said longest on-duty.

7. The voltage conversion device according to claim 6, wherein when said first on-duty calculated based on said voltage command value is larger than the maximum effective on-duty and smaller than the longest on-duty for keeping said upper arm ON for the control period length and said power supply voltage is smaller than the predetermined set value, said control device controls switching of said upper arm and said lower arm by setting said first on-duty to said longest on-duty.

8. A voltage conversion device variably changing an input voltage to an inverter, the voltage conversion device comprising:

a voltage converter including an upper arm that is made ON at a first on-duty and a lower arm that is made ON at a second on-duty determined by subtracting said first on-duty from 1, and performing voltage conversion between a power supply and said inverter by switching of said upper arm and said lower arm, said first on-duty being a period for which the upper arm is kept ON in one control period length and said second on-duty being a period for which the lower arm is kept ON in one control period length; and a control device controlling switching of said upper arm and said lower arm by setting said first on-duty by making a switch, at a predetermined ratio, between a maximum effective on-duty and a longest on-duty at which said upper arm is kept ON for a control period length, when said first on-duty calculated based on a voltage command value of the voltage conversion by said voltage converter is influenced by a dead time of said upper arm and said lower arm, wherein said maximum effective on-duty is determined by dividing an effective control period length by said control period length, where said effective control period length is determined by subtracting said dead time from said control period lengths, when a voltage command value of said voltage conversion, corresponding to a calculated target value of an input voltage for the inverter, is larger than a power supply voltage and smaller than a predetermined voltage and said power supply voltage is smaller than a predetermined set value, said control device controls said voltage converter by setting said duty to a duty for instructing to stop said voltage conversion, when said voltage command value is larger than said power supply voltage and smaller than said predetermined voltage and said power supply voltage is at least said predetermined set value, said control device controls said voltage converter by setting said duty to a duty for instructing to perform said voltage conversion, and said predetermined set value is set based on an allowable maximum voltage of said power supply, a maximum value of DC current of said power supply when said voltage converter makes a transition to a state where said voltage conversion is stopped, and an internal resistance of said power supply.

9. A voltage conversion device variably changing an input voltage to an inverter, the voltage conversion device comprising:

a voltage converter including an upper arm and a lower arm and performing voltage conversion between a power supply and said inverter by switching of said upper arm and said lower arm; and a control device controlling said voltage converter so as to reduce influence of a dead time of said voltage converter on a duty of said switching, said duty being a period for which the upper arm or the lower arm is kept ON in one control period length, wherein in a case where a voltage command value of the voltage conversion by said voltage converter is larger than a power supply voltage and smaller than a predetermined voltage, said control device controls said voltage converter by setting said duty using a first duty that is a duty when a voltage of at least said predetermined voltage is said voltage command value and a second duty that is a duty when said power supply voltage is said voltage command value, and said control device sets said duty by making a switch between said first duty and said second duty at a predetermined ratio.

10. A voltage conversion device variably changing an input voltage to an inverter, the voltage conversion device comprising:

a voltage converter including an upper arm and a lower arm and performing voltage conversion between a power supply and said inverter by switching of said upper arm and said lower arm; and a control device controlling said voltage converter so as to reduce influence of a dead time of said voltage converter on a duty of said switching, said duty being a period for which the upper arm or the lower arm is kept ON in one control period length, wherein in a case where there is a possibility that a surge of DC current of said power supply occurs, said control device controls said voltage converter by setting said duty using a first duty that is a duty when a voltage of at least a predetermined voltage is a voltage command value and a second duty that is a duty when a power supply voltage is said voltage command value, and said control device sets said duty by making a switch between said first duty and said second duty at a predetermined ratio.

11. A voltage conversion device variably changing an input voltage to an inverter, the voltage conversion device comprising:

a voltage converter including an upper arm that is made ON at a first on-duty and a lower arm that is made ON at a second on-duty determined by subtracting said first on-duty from 1, and performing voltage conversion between a power supply and said inverter by switching of said upper arm and said lower arm; and a control device controlling switching of said upper arm and said lower arm by changing a carrier frequency at which switching of said upper arm and said lower arm is controlled, according to an increase of said first on-duty, when said first on-duty calculated based on a voltage command value of the voltage conversion by said voltage converter is influenced by a dead time of said upper arm and said lower arm, wherein said control device changes said carrier frequency in a predetermined period at start of said voltage conversion and in a predetermined period at a transition to a state where said voltage conversion is stopped.

12. A voltage conversion device variably changing an input voltage to an inverter, the voltage conversion device comprising:

a voltage converter including an upper arm and a lower arm and performing voltage conversion between a power supply and said inverter by switching of said upper arm and said lower arm; and a control device controlling said voltage converter so as to reduce influence of a dead time of said voltage converter on a duty of said switching wherein when a voltage command value of the voltage conversion by said voltage converter is larger than a power supply voltage and smaller than a predetermined voltage, said control device controls said voltage converter by changing a carrier frequency at which switching of said upper arm and said lower arm is controlled, wherein when said control device performs control for stepping down an output voltage of said voltage converter or control for stepping up the output voltage of said voltage converter and said voltage command value is larger than said power supply voltage and smaller than said predetermined voltage, said control device changes said carrier frequency.

13. A voltage conversion device variably changing an input voltage to an inverter, the voltage conversion device comprising:

a voltage converter including an upper arm and a lower arm and performing voltage conversion between a power supply and said inverter by switching of said upper arm and said lower arm; and a control device controlling said voltage converter so as to reduce influence of a dead time of said voltage converter on a duty of said switching wherein when a voltage command value of the voltage conversion by said voltage converter is larger than a power supply voltage and smaller than a predetermined voltage, said control device controls said voltage converter by changing a carrier frequency at which switching of said upper arm and said lower arm is controlled, wherein when said control device performs control for stepping down an output voltage of said voltage converter and said voltage command value is larger than said power supply voltage and smaller than said predetermined voltage, said control device changes said carrier frequency.

14. A voltage conversion device variably changing an input voltage to an inverter, the voltage conversion device comprising:

a voltage converter including an upper arm and a lower arm and performing voltage conversion between a power supply and said inverter by switching of said upper arm and said lower arm; and a control device controlling said voltage converter so as to reduce influence of a dead time of said voltage converter on a duty of said switching wherein when a voltage command value of the voltage conversion by said voltage converter is larger than a power supply voltage and smaller than a predetermined voltage, said control device controls said voltage converter by changing a carrier frequency at which switching of said upper arm and said lower arm is controlled, wherein said predetermined voltage is determined based on the dead time of said voltage converter.

* * * * *

UNITED STATES PATENT AND TRADEMARK OFFICE
CERTIFICATE OF CORRECTION

PATENT NO. : 7,656,690 B2
APPLICATION NO. : 11/274511
DATED : February 2, 2010
INVENTOR(S) : Kenji Yamada et al.

It is certified that error appears in the above-identified patent and that said Letters Patent is hereby corrected as shown below:

| Column | Line | |
|---|---|---|
| 13 | 28 | Change "on-dury D_MA" to --on-dury D_MAX--. |
| 29 | 14-15 | Change "$1.0 (x \leq D\_ON\_1 < 1,$" to --$1.0 (x \leq D\_ON\_1 \leq 1,$-- |

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,656,690 B2 | Page 1 of 1 |
| APPLICATION NO. | : 11/274511 | |
| DATED | : February 2, 2010 | |
| INVENTOR(S) | : Kenji Yamada et al. | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 688 days.

Signed and Sealed this

Twenty-second Day of June, 2010

David J. Kappos
*Director of the United States Patent and Trademark Office*